United States Patent [19]

Bates et al.

[11] Patent Number: 5,701,489

[45] Date of Patent: Dec. 23, 1997

[54] SYSTEM FOR PARTIAL IN-LINE EXPANSION OF PROCEDURE CALLS DURING PROGRAM COMPILATION

[75] Inventors: Cary Lee Bates; Blair Wyman, both of Rochester, Minn.

[73] Assignee: International Business Machines Corporation, Armonk, N.Y.

[21] Appl. No.: 466,532

[22] Filed: Jun. 6, 1995

[51] Int. Cl.$^6$ .................................................. G06F 9/45
[52] U.S. Cl. ........................................ 395/705; 395/709
[58] Field of Search ................................ 395/700, 705, 395/709

[56] References Cited

U.S. PATENT DOCUMENTS

| | | | |
|---|---|---|---|
| 5,175,856 | 12/1992 | Van Dyke et al. | 395/700 |
| 5,280,617 | 1/1994 | Brender et al. | 395/700 |
| 5,375,242 | 12/1994 | Kumar et al. | 395/700 |
| 5,519,866 | 5/1996 | Lawrence et al. | 395/700 |

OTHER PUBLICATIONS

A.V. Aho et al, "Compilers, Principles, Techniques, and Tools", 1988, 1st Edition, pp. 528–529.

A. Holland et al, "A Compiler for Selective Procedure Inlining", 1993, ACM 31st Annual Southeast Conference, pp. 207–212.

J.E. Ball, "Predicting the Effects of Optimization on a Procedure Body", 1979, AMC, pp. 214–220.

R. W. Scheifler, "An Analysis of Inline Substitution for a Structured Programming Language", 1977 ACM Student Award Paper, First Place, pp. 647–654.

O. Kaser, et al, "On the Conversion for Indirect to Direct Recursion", AMC Letters on Programming Languages and Systems, vol. 2, Nos. 1–4, Mar.–Dec. 1993, pp. 151–164.

Primary Examiner—Kevin A. Kriess
Assistant Examiner—Kakali Chaki
Attorney, Agent, or Firm—Terrance A. Meador

[57] ABSTRACT

A system for the in-line expansion of a portion of the program body otherwise rejected as too expensive for full in-line expansion during intermediate code optimization by a compiler. The partial in-lining system first attempts the full in-line expansion of a procedure call by replacing it with the procedure body in the usual manner. If the procedure body is rejected for exceeding an in-lining threshold, a control flow graph for the procedure body is generated and examined for "emittable" subgraphs, each of which is replaced by a new procedure call to a new procedure body containing the emitted (expensive) subgraph. Following one or more subgraph emissions to eliminate the expensive portions of the original procedure body, the "reduced" procedure body is again passed to the in-line expansion process.

15 Claims, 29 Drawing Sheets

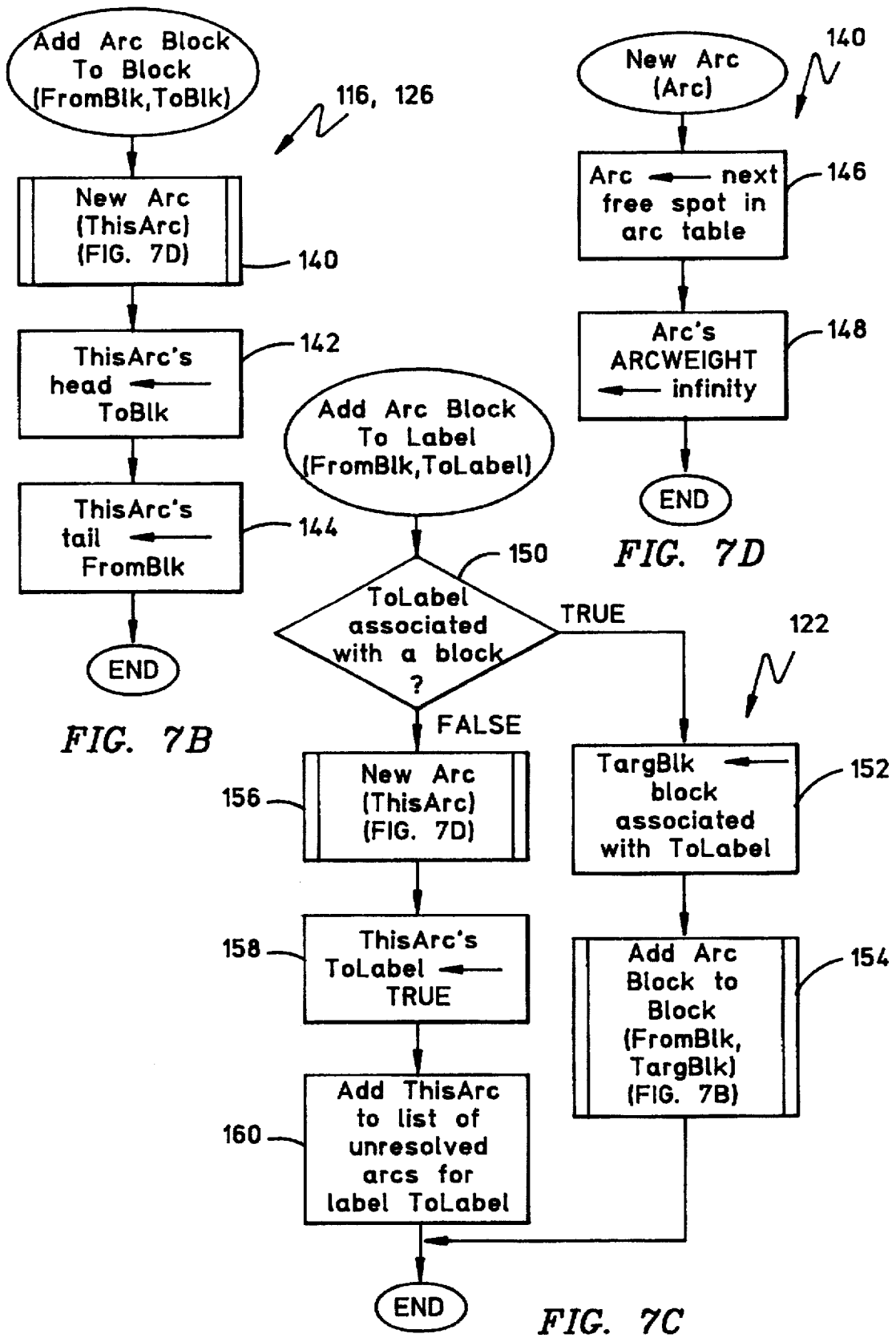

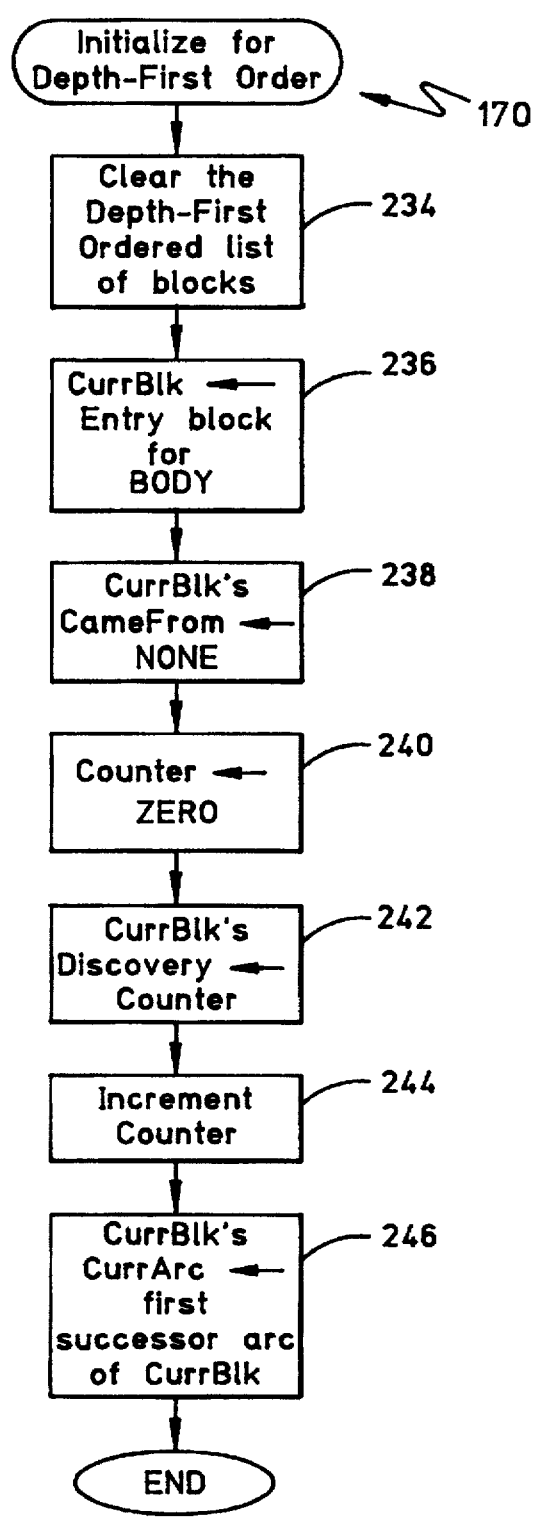
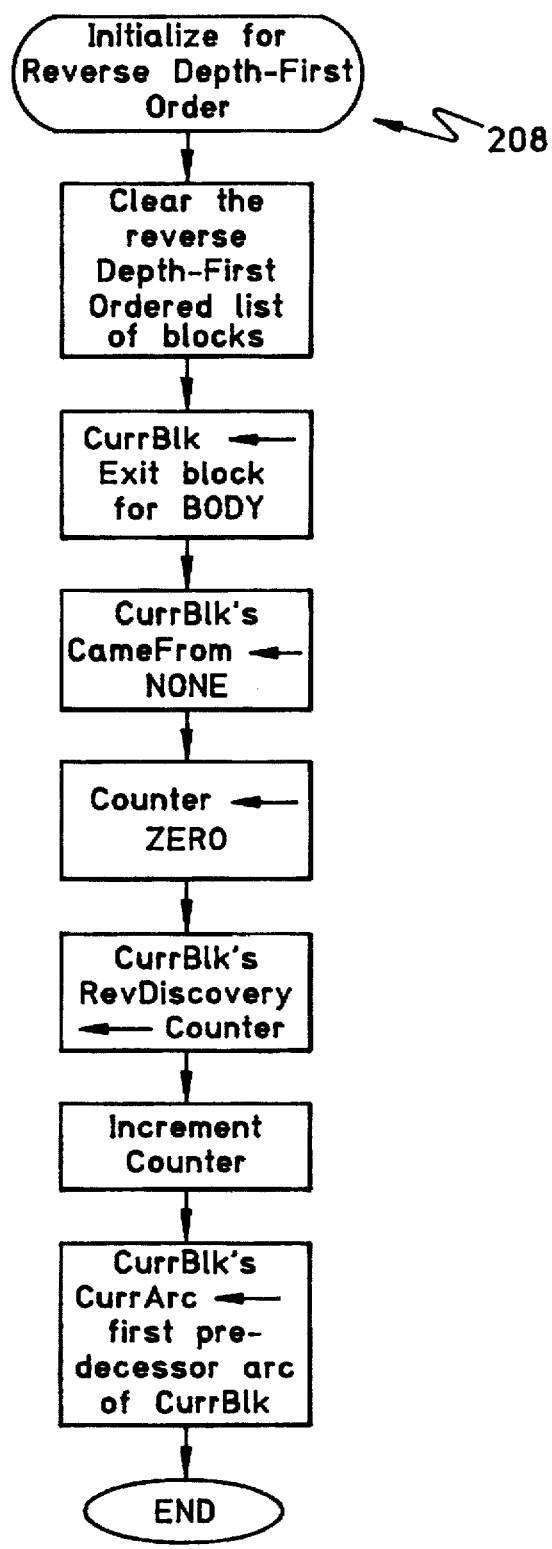
*FIG. 10A*  *FIG. 10B*

SYSTEM FOR PARTIAL IN-LINE EXPANSION OF PROCEDURE CALLS DURING PROGRAM COMPILATION

BACKGROUND OF THE INVENTION

1. Field of the Invention

This invention relates generally to computer program compiler systems for optimizing compiler output code and specifically to such systems that employ in-line expansion to reduce the execution cost of compiled code.

2. Description of the Related Art

A compiler can be simply viewed as a computer program that reads a computer program written in one language (the source language) and translates it into an equivalent computer program written in another language (the target language). Conceptually, a compiler operates in phases, each of which transforms the source program from one representation to another. FIG. 1 shows the typical sequence of compiler phases described by A. V. Aho et al. (*Compilers: Principles, Techniques, and Tools*, Addison-Wesley Publishing Company, Reading, Mass., 1988). The symbol-table manager 30 and the error handler 32 are shown interacting with six other compiler phases, each of which is well-known in the art. Of particular interest to this disclosure is the intermediate code generator 34 and the code optimizer 36.

Intermediate code generator 34 creates an explicit intermediate representation of the source program in one of many different forms known in the art, such as the "three-address code" format. Three-address code consists of a sequence of instructions, each of which has at most three operands and at most one operator in addition to an assignment operator. Code optimizer 36 attempts to "improve" the intermediate code produced by generator 34 to produce more "efficient" (lower execution time and space requirements) target program code upon completion of the compiling process. There is great variation in the amount of code optimization performed by various compilers known in the art.

One particular code optimization technique known in the art is herein denominated "in-line-expansion," which is also known as "procedure in-lining" and "in-line substitution." Simply stated, in-line expansion consists of replacing a "procedure invocation" with a modified copy of the invoked procedure body. As used herein, invocation means a statement or expression that "calls" an explicitly named procedure when executed. Named procedures include subroutines, subprograms, and functions as well as other similar concepts.

The in-line expansion transformation eliminates the execution-time overhead of the control linkage, state saving, and parameter passing operations of the procedure call. More importantly, it allows the compiler to optimize the caller and the body of the procedure together. This permits common subexpression elimination and register allocation without the usual loss of context caused by the procedure call. Much more precise data flow information is available when analyzing a particular procedure call in context and information about the values of parameters and global variables can be propogated into the procedure body. In-line expansion is especially valuable when applied to source programs written in a highly-modular style because the procedure body execution cost is more likely to be short and fast compared to the procedure call execution overhead.

The in-line expansion of a procedure call always reduces the overall execution time of the object code, but may increase execution code space consumption. Accordingly, the compiler must test each in-line substitution and decide whether the overall "execution cost" savings are worthwhile in terms of the combined changes in space consumption and execution speed. Practitioners in the art have proposed several techniques for deciding whether to make an in-line substitution for a particular procedure call during compilation.

For instance, J. Eugene Ball ("Predicting the Effects of Optimization on a Procedure Body," *Proceedings of the SIGPLAN Symposium on Compiler Construction*, Denver, Colo., 6–10 Aug. 1979, ACM Vol. 14, No. 8, pp. 214–220) describes a technique for predicting the code improvement that can be expected from the integration of a procedure call involving constant actual parameters. Bali's technique uses information collected during a single data flow analysis of each procedure body together with the execution frequency statistics for the procedure to estimate the cost in code size and benefit in execution speed of integrating each call to the procedure. Similarly, A. Holland et al. ("A Compiler for Selective Procedure Inlining," *Proceedings of the 31st Annual Southeast Conference*, Birmingham, Ala., 14–16 Apr. 1993, ACM, pp. 207–212) describe a selective in-lining technique that requires the construction of a "loop-call graph" to show the interactions among loops and procedure calls in a computer program. Holland et al. incorporated a loop-call graph construction algorithm into a compiler to permit the compiler to "Select" from among the many procedure calls those to be expanded by in-line substitution of the corresponding procedure bodies. The selection criteria include cache consumption, the procedure call overhead costs and register demand. Cache consumption is affected by the increased size of target code resulting from in-line expansion. Procedure call overhead cost also includes the cost of saving and restoring registers around the procedure call, passing parameters, establishing local variables and transferring control to and from the procedure. Register demand is affected by the registers available for allocation when a procedure call is made.

O. Kaser et al. ("On the Conversion of Indirect to Direct Recursion," *ACM Letters on Programming Languages and Systems*, Vol. 2, Nos. 1–4, March–December 1993, pp. 151–164) present necessary and sufficient conditions under which in-line expansion can transform all mutual recursion to direct recursion and conditions under which heuristics to eliminate mutual recursion always terminate. Kaser et al. consider only one of the benefits of in-line expansion; the elimination of mutual recursion that permits additional optimization using other techniques that are most easily applied to directly recursive procedures.

O. W. Scheifler ("An Analysis of Inline Substitution for a Structured Programming Language," *Commun. ACM*, Vol. 20, No. 9, pp. 647–654, September 1977) analyzes the in-line expansion technique as applied to a highly-modular programming system and finds that over ninety percent of all procedure calls can be eliminated in programs with low recursion levels.

All of the above practitioners describe the in-line expansion technique as "failing" to replace certain procedure calls with the procedure code body. Such "failure" is purposely induced to avoid losing code execution efficiency by making counterproductive expansions. Thus, it is well-known in the art to test procedure calls for expansion and to condition actual call replacement on some execution cost savings criteria (usually code length or space). The decision to replace any particular procedure call with the corresponding procedure body is an "all-or-nothing" decision in the art.

This all-or-nothing decision leaves a clearly-felt need in the art for improved in-line expansion techniques that can reduce procedure call "failures" during in-line expansion. Practitioners have proposed several techniques for improving in-line expansion performance within a compiler. For instance, one practitioner discloses an integrated hierarchical representation (IHR) scheme for computer programs that facilitates two independent in-line expansion operations during compilation. The first expansion ("inline 1") occurs during intermediate code optimization in the usual manner and "fails" at some procedure calls for the usual reasons. The second in-line expansion ("inline 2") occurs during the later optimization of the machine-dependent target code. The second in-line expansion is facilitated by the particular IHR target code format employed by this practitioner and can expand at least some procedure calls that "failed" during the earlier in-line expansion of the machine-independent intermediate code.

Another practitioner discloses a compiler architecture that permits cross-modular optimization, including in-line expansion across files. Source files are compiled into intermediate code files consisting of intermediate language instructions that can be optimized for execution on a predetermined computer system. A linkage subsystem is then used to optimize the code in several intermediate code files and to link the resulting object code with any other necessary object code files for execution on the predetermined computer. Essentially, the in-line expansion step is delayed until after optimization of the intermediate code (contrary to usual practice) to obtain the advantage of cross-module optimization. These practitioners merely revise the sequence of the usual all-or-nothing in-line expansion technique known in the art and other compiler optimization steps to obtain specific advantages.

Accordingly, there is still a clearly-felt need in the art for an improved in-line expansion method without which practitioners are obliged to accept relatively inefficient compiler output code upon in-line failure. The unresolved problems and deficiencies are clearly felt in the art and are solved by this invention in the manner described below.

SUMMARY OF THE INVENTION

The partial in-lining system of this invention solves the above problem by reconsidering procedure calls that are first rejected for full in-line expansion during compilation. The partial in-lining system of this invention examines the control flow graph (CFG) of the rejected procedure body to determine what portions should be expanded, if any. The rejected procedure body is examined to locate and isolate the code portions responsible for the rejection during full in-line expansion. These portions are then removed and replaced with one or more new procedure calls to themselves before again attempting full in-line expansion of the rejected procedure call. That is, the portions containing "expensive" loops and calls in the rejected procedure body are replaced with one or more calls to new procedures containing the removed portions. After this modification of the original procedure body, the modified procedure body is then presented for reconsideration, upon which the amended procedure body is accepted for replacement of the original procedure call.

An important object of this invention is to in-line as much as possible of an expensive procedure body that otherwise cannot be in-lined. The partial in-liner of this invention may replace a rejected procedure call with a procedure body containing another procedure call to a new procedure into which are banished the expensive elements that disqualified the original procedure body.

Another important object of this invention is to ensure that partial in-line expansion always improves execution cost (storage efficiency). The partial in-liner of this invention rejects the amended procedure body ("fails miserably") if the new calls to emitted subgraphs have larger parameter lists than would be associated with the original procedure call or if no available subgraph has a weight below a predetermined threshold.

The partial in-liner uses a control flow graph (CFG) representation of the intermediate compiler code to perform the necessary depth-first and reverse depth-first analyses of each rejected procedure body. An incremental increase in compiler output code execution efficiency of ten percent can be achieved using the partial in-liner of this invention.

The foregoing, together with other objects, features, and advantages of this invention, can be better appreciated with reference to the following specification, claims, and the accompanying drawing.

BRIEF DESCRIPTION OF THE DRAWINGS

For a more complete understanding of this invention, reference is now made to the following detailed description of the embodiments as illustrated in the accompanying drawing, wherein:

FIG. 6, comprising

FIGS. 7A–7E are flow chart diagrams showing several methods from FIG. 6;

FIG. 9, comprising

FIGS. 10A–10B are flow chart diagrams showing the CFG traverse methods from FIG. 9;

FIG. 11, comprising

FIG. 14, comprising

DESCRIPTION OF THE PREFERRED EMBODIMENT

Introduction

Figure 1:
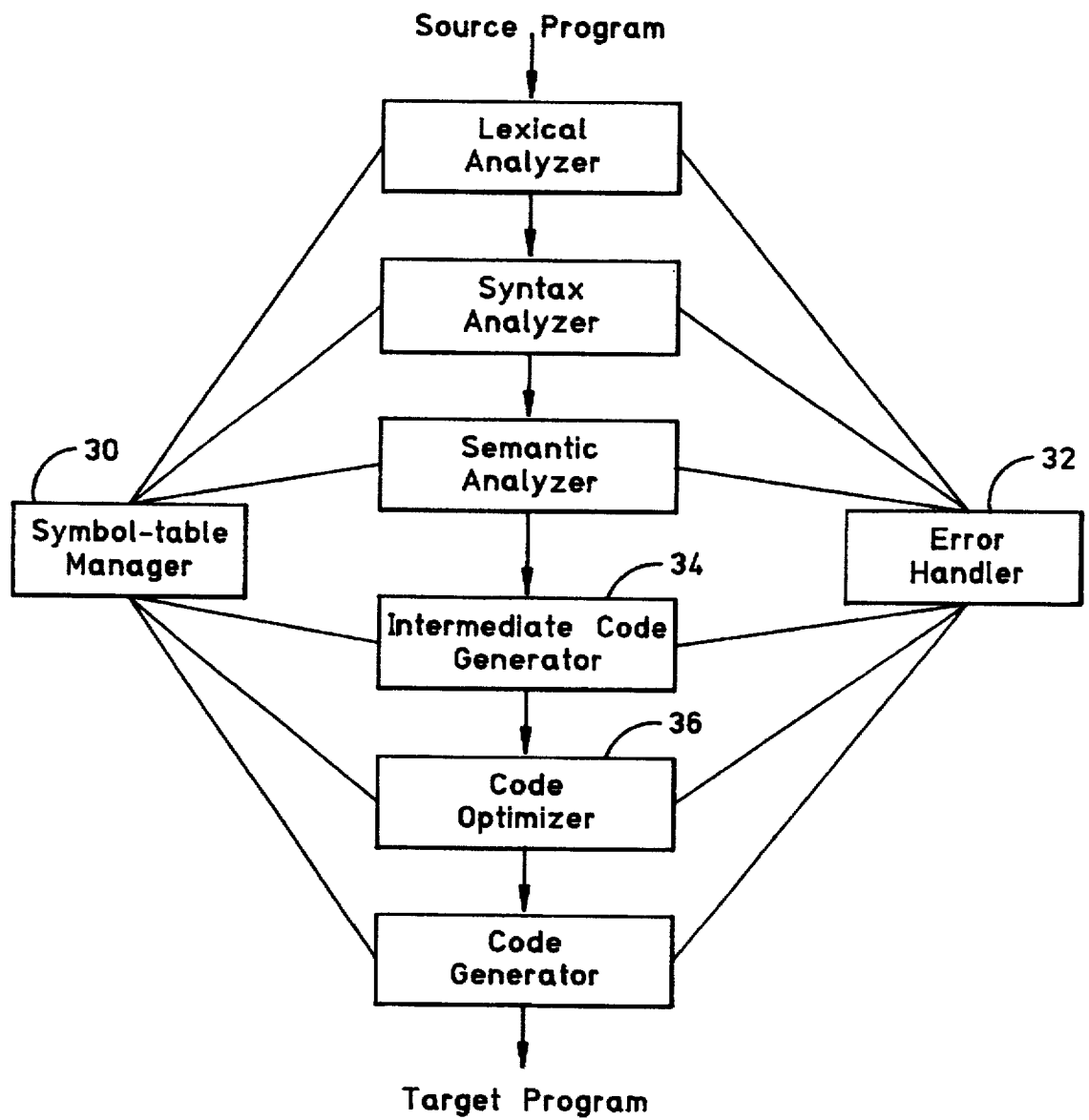
FIG. 1 is a functional block diagram of a generic computer program compiler known in the prior art.
Figure 2:
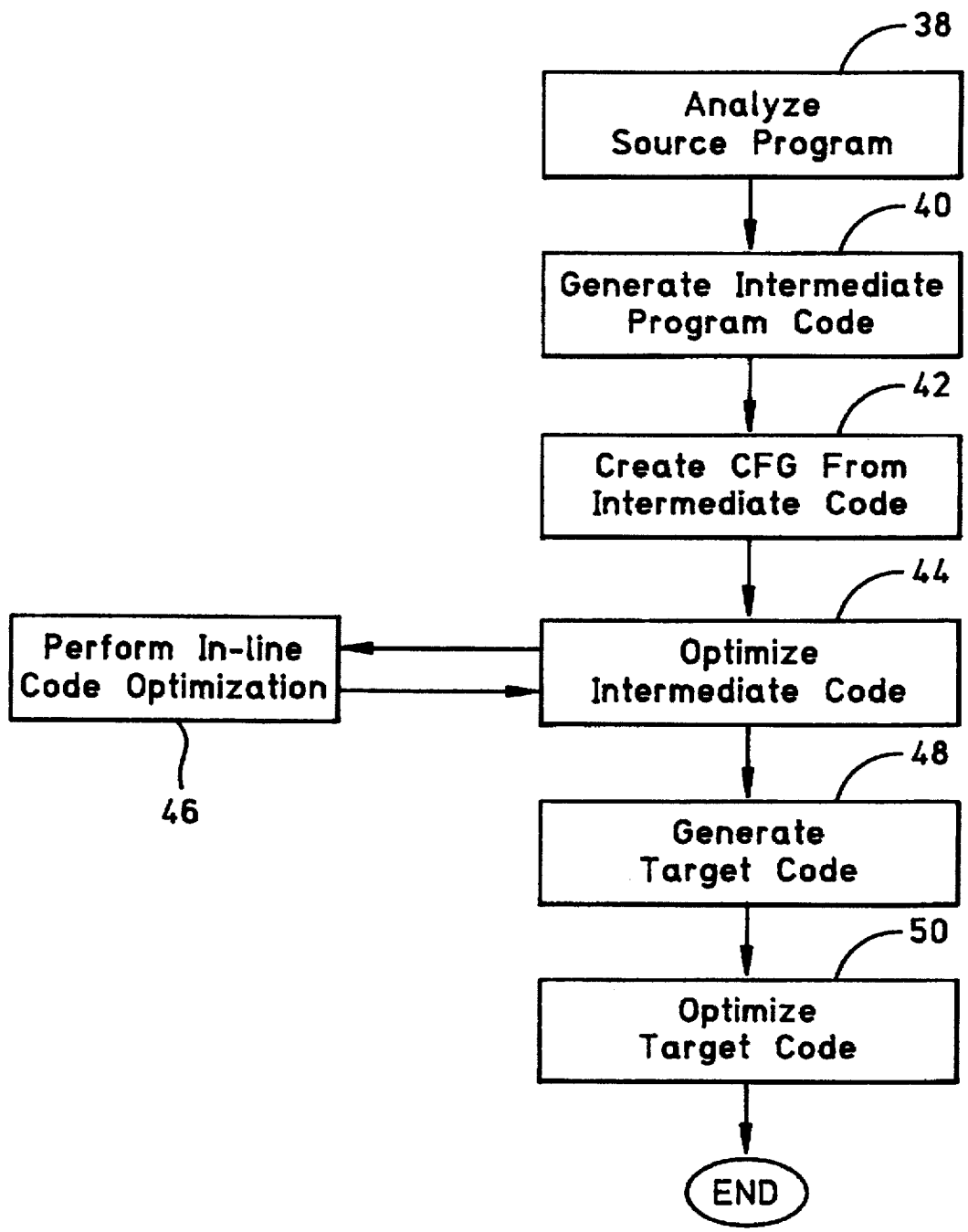
FIG. 2 is a flow chart diagram showing a compiler optimization method incorporating the partial in-line expansion method of this invention.

FIG. 2 is a flow chart diagram of an exemplary compiler optimization method incorporating the method of this invention. Step 38 performs the usual lexical, syntactical, and semantic analyses of the source program known in the art. Step 40 generates an intermediate program code representing the source program in a manner known in the art. Normally, the intermediate program code includes a list of three-address instructions that can be appreciated with reference to the above cited Aho et al. reference. Step 42 creates a control flow graph (CFG) to represent the three-address instructions from step 40. A CFG representation of three-address statements is useful for implementing code-optimization procedures even if the CFG is not explicitly constructed during compilation. The CFG consists of "basic block" nodes representing computations interconnected by "control flow arc" edges representing the flow of control. A "basic block" is known in the art as a sequence of consecutive statements in which flow of control enters at the beginning and leaves at the end without halt or possibility of branching except at the end. A "control flow arc" is known in the art as a data structure specifying a "tail node" (origin) and "heading node" (destination).

After creating the CFG for the computer program, step 44 optimizes the intermediate code to reduce overall execution cost, which includes but is not limited to execution time and space considerations. The intermediate code optimization step includes step 46, which performs in-line expansion of procedure calls. A number of transformations may be applied to a basic block without changing the set of expressions computed by the block and many of these transformations are useful for improving the execution efficiency of the intermediate code. Optimization step 44 attempts several well-known basic block transformations, including structure-preserving transformations and algebraic transformations, when optimizing the basic block. Normally, in-line expansion step 46 is performed first so that subsequent transformations may benefit from localizing the procedure bodies within the intermediate code.

Following optimization step 44, step 48 generates the target code, which is usually a machine-dependent binary object code. Finally, a second optimization step 50 applies several different transformations to the target code for machine-dependent optimization of execution costs. The partial in-line expansion method of this invention is included in in-line optimization step 46, which is now described in detail.

The Partial In-Line Expansion Invention

Figure 3A:
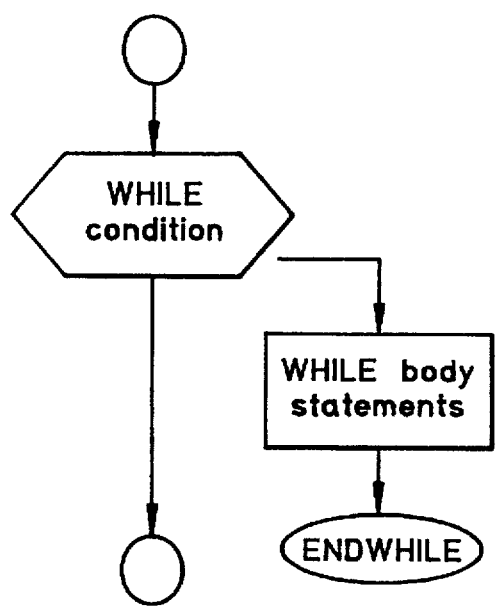
FIGS. 3A–3D provide the logical definition of the WHILE and FOR loop symbols used herein.
Figure 3C:
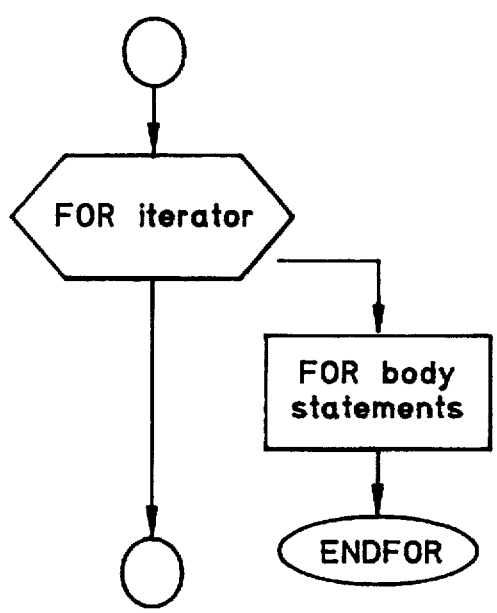
Figure 3B:
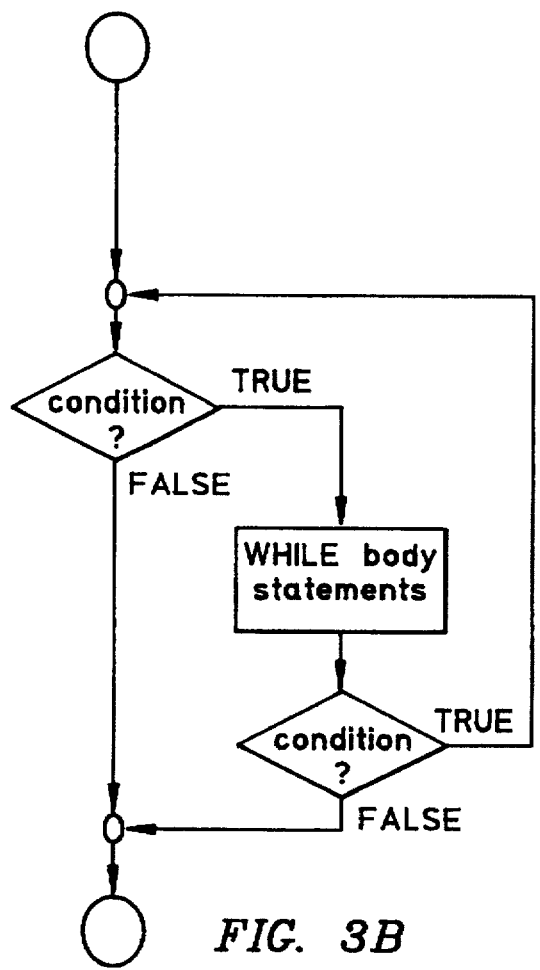
Figure 3D:
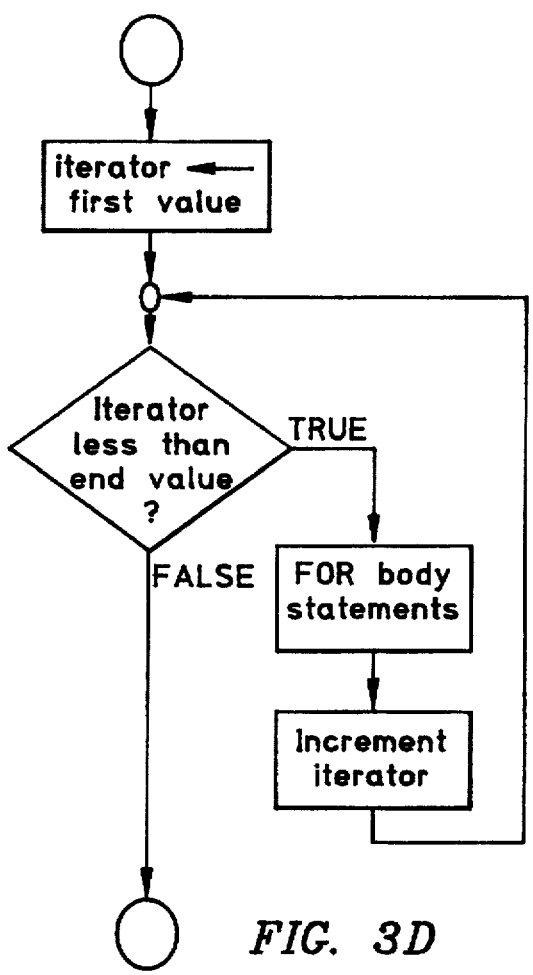

For the purposes of this disclosure, all WHILE and FOR flow chart loops are represented by the simplified symbols shown in FIGS. 3A and 3C, respectively. Thus, in FIGS. 4-19, the WHILE condition diagram shown in FIG. 3A should be construed to denote the logic diagram shown in FIG. 3B. Similarly, the FOR iterator diagram shown in FIG. 3C should be construed to denote the logic diagram shown in FIG. 3D.

Figure 4:
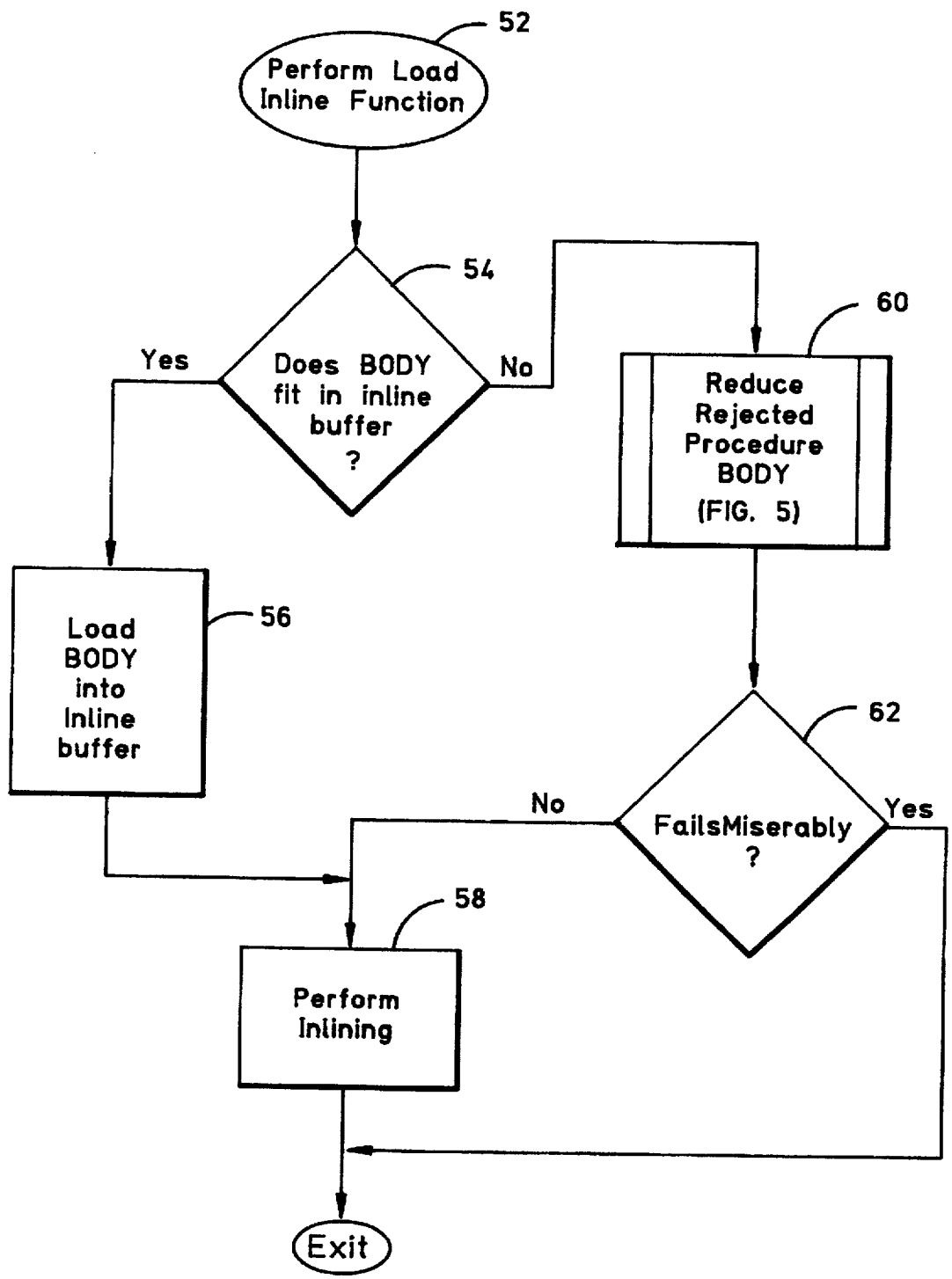
FIG. 4 is a flow chart diagram showing an in-line expansion method incorporating the partial in-line expansion method of this invention.

FIG. 4 is a flow chart diagram of the in-line expansion method of this invention for expanding a procedure call to a procedure body, which is repeatedly executed in step 46 of FIG. 2 as the compiler traverses a computer program. The in-line expansion method in FIG. 4 begins with step 52, which initiates the procedure responsive to a procedure call to a corresponding "BODY." Step 54 tests the size (number of instruction bytes) of the corresponding procedure body against an in-line buffer length threshold, which may be either predetermined or dynamically redetermined from changes in execution cost objectives. In this exemplary embodiment, the execution space requirements of the procedure body are alone considered by the full in-liner when testing "execution cost" against a predetermined threshold. This is typical in the art because execution time of a procedure body is usually reduced by in-line substitution through elimination of procedure call overhead. However, this simplification ignores the possibility that later basic block transformations may further improve execution time and substantially reduce execution space requirements through procedure body locality effects on later basic block transformations.

If the procedure body satisfies the in-line buffer threshold requirement at step 54, then step 56 loads the entire procedure body into the in-line buffer so that the full-expansion step 58 can replace the procedure call code with the procedure body code in the usual manner.

If the procedure body is rejected at step 54, instead of bypassing step 58 and "failing" to replace the procedure call, the method of this invention proceeds to a secondary partial in-lining procedure 60, which attempts to modify the rejected procedure body through removal and emission of the expensive portions (internal procedure calls and loops) and substitution of new calls to these "emitted" portions. After "reducing" the rejected procedure body in step 60, step 62 tests the "FailsMiserably" flag to determine whether the slimmed-down procedure body successfully satisfies the in-line threshold that was not satisfied in step 54. If the reduced procedure body is again rejected for excess size at step 62, the process exits in the usual manner without replacing the procedure call. If the reduced procedure body is accepted at step 62, then step 58 expands the original procedure call with the reduced procedure body in the usual full expansion manner before exiting.

The following Table 1 describes the data structures needed for the basic block nodes of this invention.

TABLE 1

| | Basic Block Node Data Structure |
|---|---|
| NodeWeight | Based on instruction number and types and "standard" inliner weight |
| DEF | Set of variables DEFINED in this basic block ("NumVars" count) |
| REF | Set of variables REFERENCED in this basic block ("NumVars" count) |
| SuccArc | Index into ARC TABLE of this block's first successor arc |

TABLE 1-continued

Basic Block Node Data Structure

| | |
|---|---|
| PredArc | Index into ARC TABLE of this block's first predecessor arc |
| IsStart? | Indicates whether the block is "empty" (has no non-labels) |
| DfoNext | Index into BLOCK TABLE of next block in Depth-First Order (DFO) |
| RevDfoNext | Index into BLOCK TABLE of next block in Reverse DFO |
| Discovery | Counter to indicate whether the block is visited in DFO |
| SaveArc | Used during DFO to hold current when visiting succblk |
| CameFrom | Used during DFO to hold from where we came to visit this block |
| EmitMark | Used during emit to mark block as having been emitted |
| Visited | Used during the search for subgraphs to emit |
| StatementList | Contains beginning of the block's statement list |

The following Table 2 describes the data structures needed for the control flow are edges of this invention.

TABLE 2

Control Flow Arc Edge Data Structure

| | |
|---|---|
| ToLabel? | Is this arc unresolved? (Does it still point to a label?) |
| MINWEIGHT | Sum of weights of all blocks in shortest forward path to ExitBlk |
| LIVESET | Set of variables and parameters that are LIVE on this arc |
| IsBackArc? | Is this a 'backwards' arc in the control flow (is Head a loophead?) |
| NextSucc | Index into ARC TABLE of next successor arc from TailBlk |
| NextPred | Index into ARC TABLE of next predecessor arc of HeadBlk |
| TailBlk | Index into BLOCK TABLE of basic block at which this arc starts |
| HeadBlk | Index into BLOCK TABLE of basic block to which this arc points |
| GlobalSet | Subset of LIVESET variables that must be promoted to static if this arc becomes a call to an out-of-line procedure |
| ParameterSet | Subset of LIVESET that represents REQUIRED parameters on ARC |

The following Table 3 describes the label record data structure used with this invention.

TABLE 3

Label Record Data Structure

| | |
|---|---|
| LabelId | Identifier of this label |
| AssociatedBlk | Index into BLOCK TABLE of block associated with this label |
| UnresolvedLst | List of indices into the ARC TABLE of arcs to this label |

The following Table 4 describes several other global data structures necessary for the method of this invention.

TABLE 4

Other Global Variables

| | |
|---|---|
| DfoFirst | Index into BLOCK TABLE of first block in Depth-First Order (DFO) |
| RevDfoFirst | Index into BLOCK TABLE of first block in reverse DFO |
| ExitBlk | Index into BLOCK TABLE of the procedure's exit block |
| EntryBlk | Index into BLOCK TABLE of the procedure's entry block |

TABLE 4-continued

Other Global Variables

| | |
|---|---|
| Counter | Monotonically increasing value used in DFO calculation |
| HasUserFunction | Is set to TRUE if the procedure calls any user functions |
| MoveToStatic | Set of all automatic variables to be moved to static |
| RootNode | Entry node of Control Flow Graph (CFG) |
| NumVars | Number of parameters to procedure and automatic variables |
| ACCThreshold | Holds threshold accumulated so far in INLINE buffer |
| FailsMiserably | Flag indicating whether staged functions will be emitted |

Figure 5:
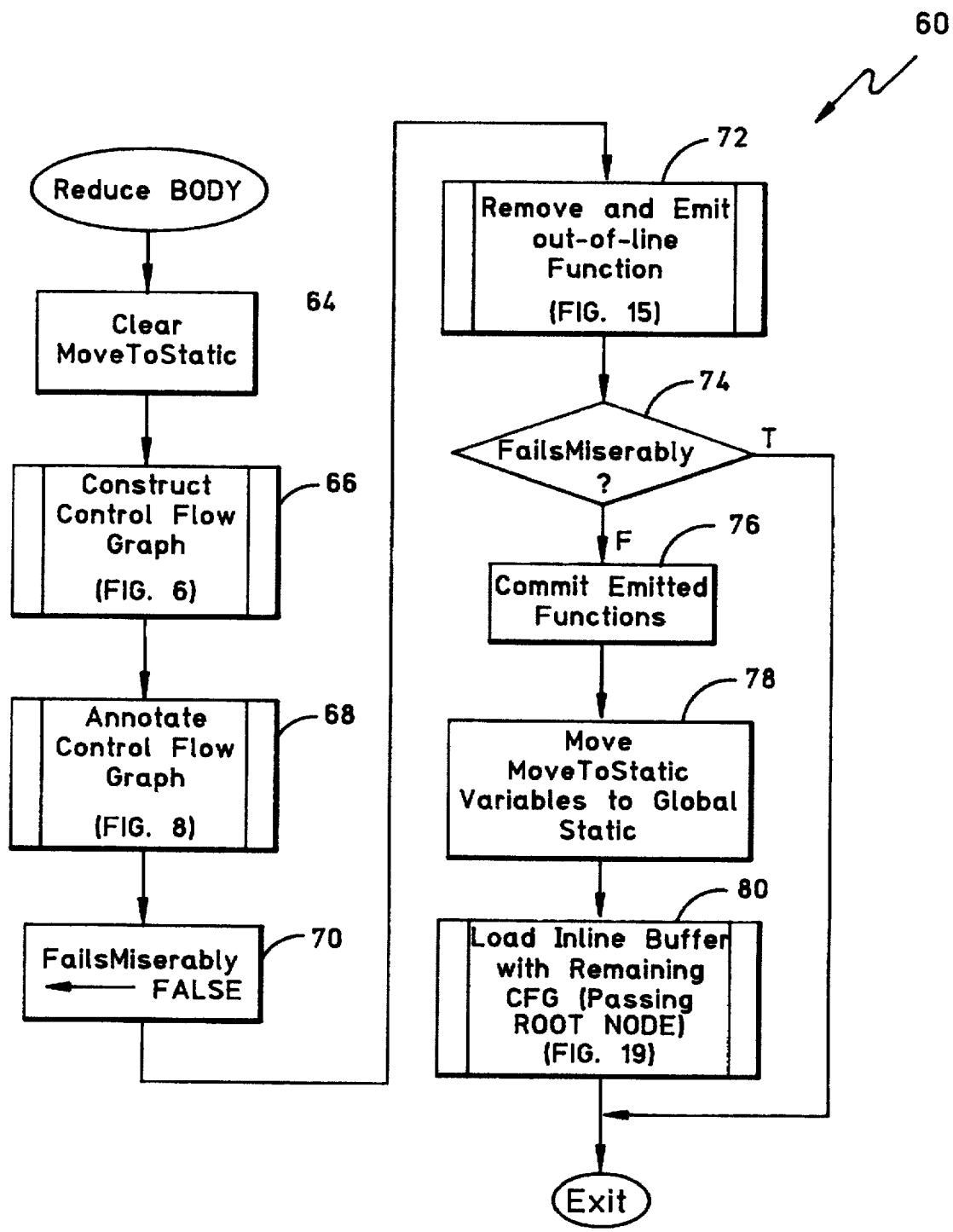
FIG. 5 is a flow chart diagram showing the partial in-line expansion method of this invention from FIG. 4.
Figure 6A:
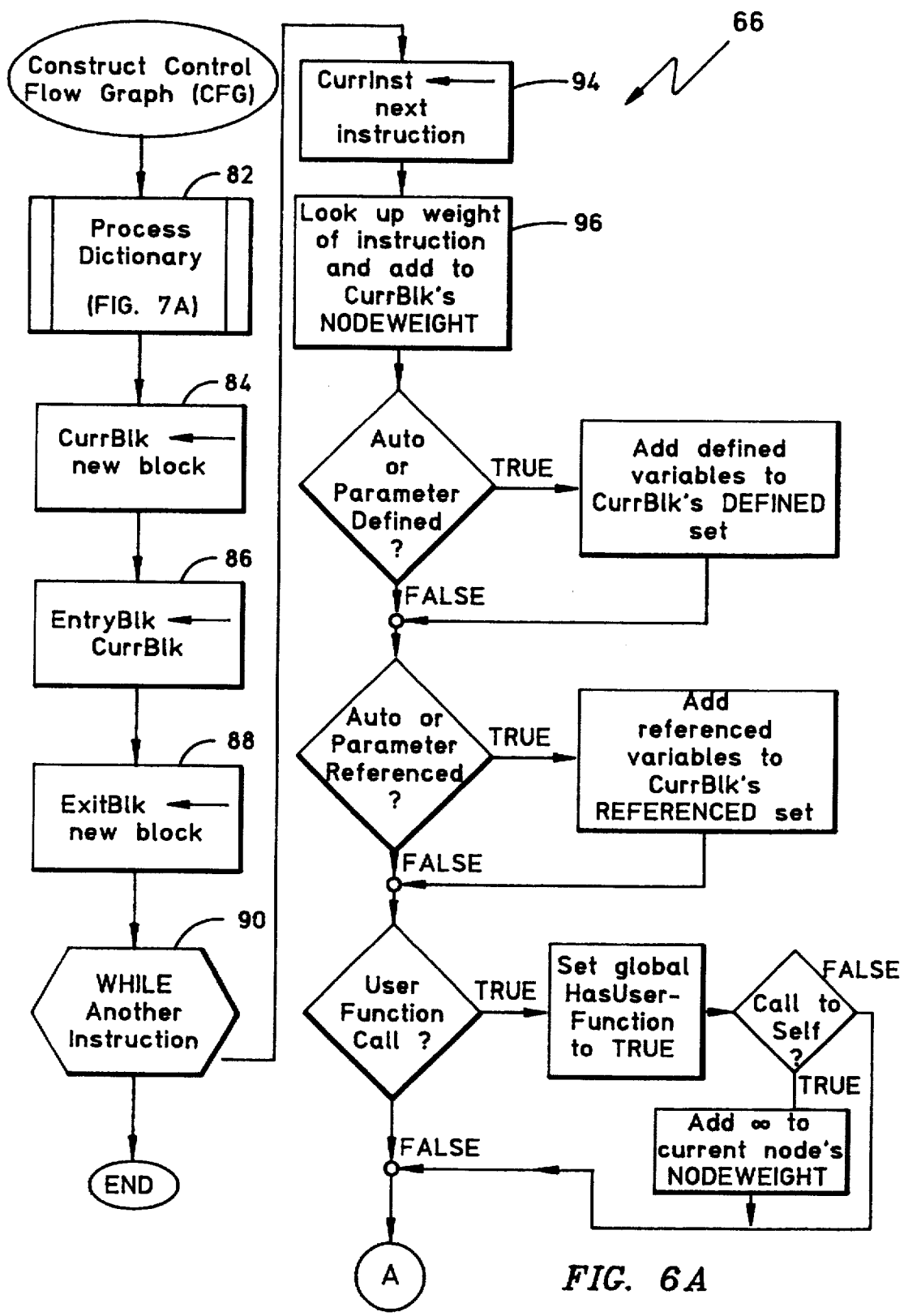
FIGS. 6A–6B, is a flow chart diagram showing the control flow graph (CFG) construction method from FIG. 5.
Figure 6B:
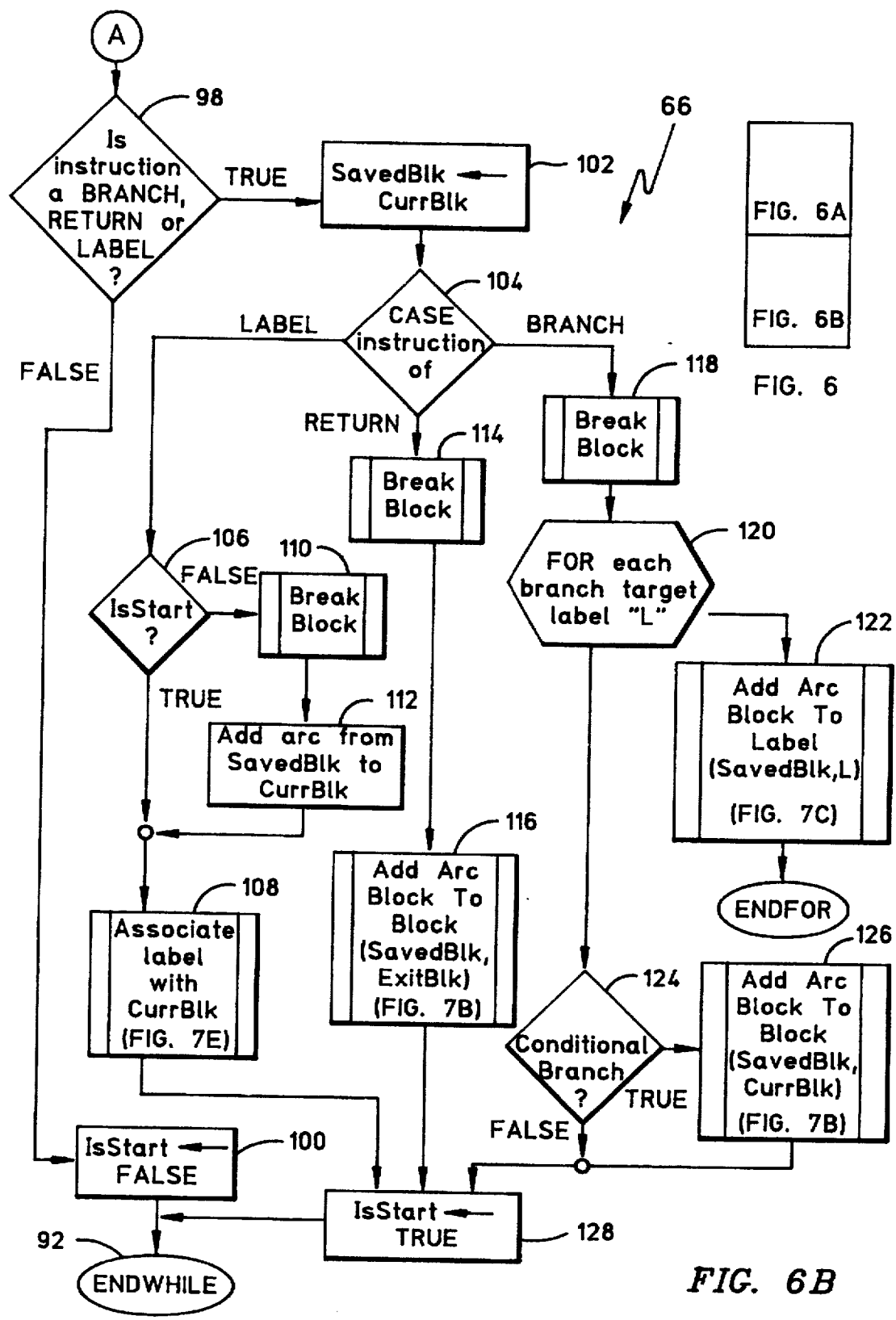

FIG. 5 is a flow chart diagram showing the details of procedure body reduction process 60 in FIG. 4. Procedure 60 begins by clearing the MoveToStatic global variable table at step 64. A CFG construction process 66 is then initiated to construct a control flow graph (CFG) representing the rejected procedure body. After CFG construction, a CFG annotation process 68 computes CFG "weights" representing approximate execution costs associated with both nodes and arcs of the procedure body CFG and determines the sets of variables or parameters that must be passed to an emitted subgraph procedure or that must be promoted to static if the arc becomes a procedure call. Step 70 then assigns FALSE to a FailsMiserably flag to initialize it before beginning the Remove and Emit process 72, which analyzes the rejected procedure CFG to detect subgraphs that can be "emitted" as new procedure bodies and replaced with new procedure calls to reduce the rejected body. If the reduced procedure body is found to be more costly than the original rejected procedure body (by testing within process 72), then step 74 "fails miserably" and the procedure body reduction process 60 exits immediately without changing the rejected procedure body. If process 72 succeeds in reducing the size of the rejected procedure body, then step 74 passes control to step 76, which "commits" the emitted subgraph by creating new procedures from them. Step 78 moves all MoveToStatic variables to global static storage to accommodate the committed procedure body changes before the in-line buffer loading process 80 loads the reduced procedure body from processor 72 into the in-line buffer for replacement of the rejected procedure call where it is invoked. As may be appreciated with reference to the detailed description below, body reduction process 60 fails if and only if the rejected procedure body contains a user function call and any of the fabricated subprocedure parameter lists are too large or all paths from CFG entry node to CFG exit node are too "expensive" to avoid rejection by the full in-liner. FIG. 6, comprising FIGS. 6A–6B, is a flow chart diagram of CFG construction process 66 in FIG. 5. Process 66 first evaluates the procedure body Dictionary at step 82. The Dictionary is part of the rejected procedure body input and step 82 (see FIG. 7A) counts the variables and parameters in the Dictionary and lists all automatic variables or parameters, reserving a table slot for each Dictionary entry. Step 84 then creates the current basic block node (CurrBlk) and steps 86 and 88 create CFG Entry and Exit Nodes, respectively, assigning CurrBlk to the Entry Node. After initializing, step 90 begins a WHILE condition stepping through the procedure body, ending at the ENDWHILE step 92 in FIG. 6B. WHILE condition 90 steps through the procedure body instructions, beginning with step 94, which loads the "next instruction" into CurrInstr. Each instruction is assigned a weight that represents an "execution cost" associated with that instruction. This "weight" is preferably made available in a look-up table from which it is retrieved in step 96 and added to the NODEWEIGHT of the CurrBlk. The subsequent steps in FIG. 6A then examine the CurrInstr to determine whether it defines an automatic variable or parameter (added to the CurrBlk's DEFINED set), references an automatic variable or parameter (added to the CurrBlk's REFERENCED set) or includes a user function call (sets a HasUserFunction flag to TRUE). Note that if a user function call is to this self-same procedure, NODEWEIGHT is made as large as possible. Each of these variables is set forth in Tables 1-4 above.

Continuing in FIG. 6B, step 98 looks for a BRANCH, RETURN or LABEL instruction that would force an end to the current basic block. If CurrInstr is none of these, then step 100 initializes IsStart with FALSE and recirculates back to WHILE condition 90 for the next body instruction. If CurrInstr must end the current basic block, then step 102 moves CurrBlk into SavedBlk before going to step 104 to construct the necessary control flow arcs leaving from the completed SavedBlk. Each of the three instructions; BRANCH, RETURN and LABEL; are treated independently. For the LABEL instruction, step 106 first tests the IsStart flag and associates the LABEL with the current block at step 108 when the LABEL immediately follows a BRANCH, RETURN or LABEL instruction (i.e., when LABEL is first in the new CurrBlk). Otherwise, the current basic block is broken at step 110 and a control flow arc is added from SavedBlk to a new CurrBlk at step 112 before associating LABEL with the new current block at step 108 (as the first entry) in the manner shown in FIG. 7E.

For a RETURN instruction, the current basic block is broken at step 114 immediately before adding a control flow arc from the completed SavedBlk to the Exit Node at step 116. Similarly, for the BRANCH instruction, the current basic block is broken immediately at step 118 and the FOR iterator 120 adds a control flow arc from the saved block to each of the several labelled branch target blocks by repeating step 122. At completion of FOR iterator 120, step 124 tests for a conditional BRANCH and step 126 adds a control flow arc, from the completed saved block to the incomplete current block to account for control transfer upon failure of the branching condition. Finally, after adding all control flow arcs out of the SavedBlk to the appropriate CurrBlk, ExitBlk or labeled branch target blocks, step 128 resets the IsStart flag to TRUE (showing start of a new node) before returning to WHILE condition 90 in FIG. 6A for the next instruction.

Figure 7A:
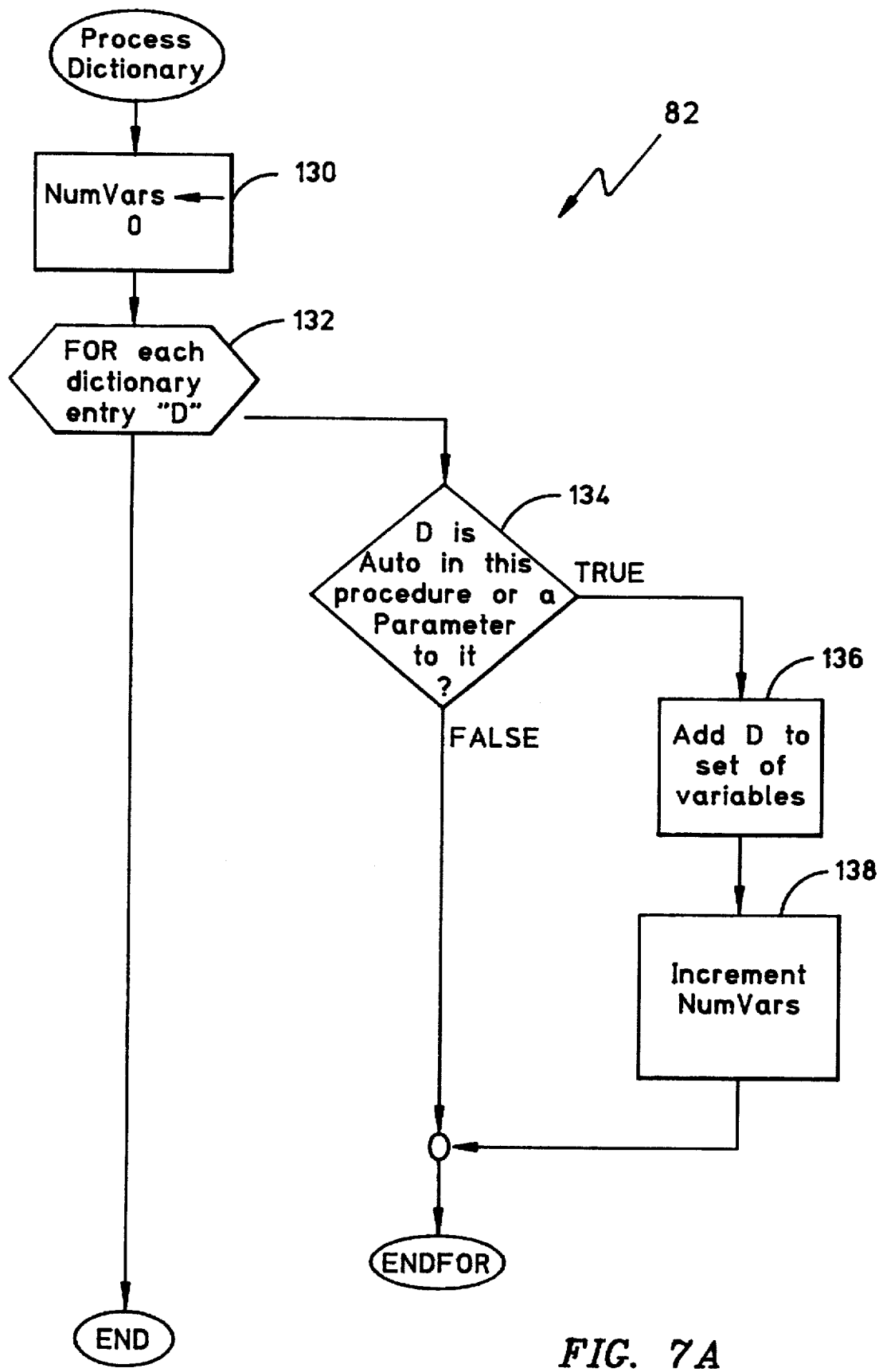

FIG. 7A is a flow chart diagram of Dictionary process step 82 in FIG. 6. Dictionary processing begins with initializing NumVars to zero at step 130 before immediately starting a FOR iterator 132, which steps through each dictionary entry. Step 134 tests dictionary entry "D" to determine if it is automatic in this procedure body or if it is a parameter to this procedure body. If neither, "D" is ignored. If either, step 136 adds "D" to the variable set for the procedure body and increments NumVars at step 138 before returning to FOR iterator 132 for the next entry.

Figure 7E:
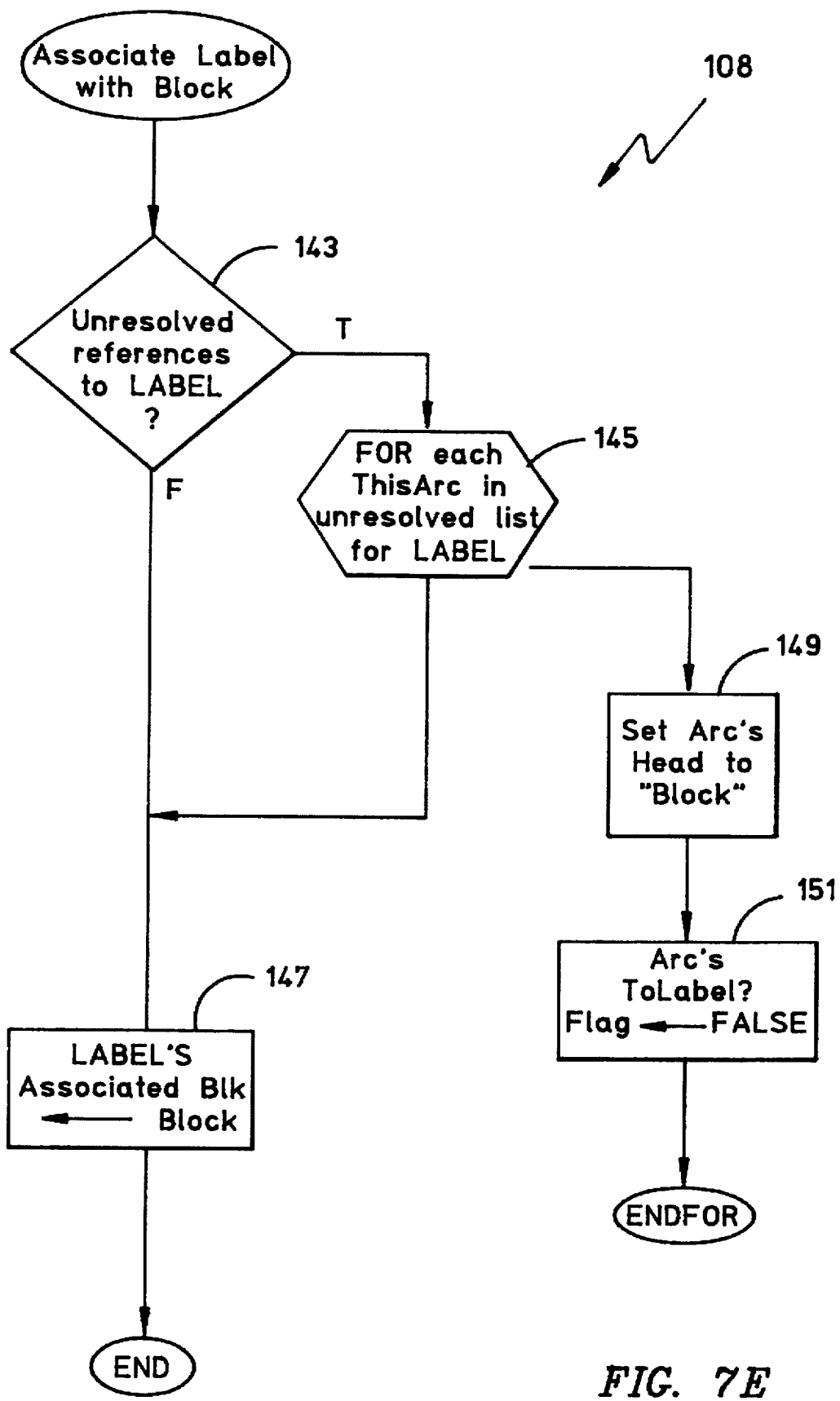

FIG. 7B is a flow chart diagram of control flow arc generation steps 116 and 126 in FIG. 6. Depending on the identification of FromBlk and ToBlk passed from the calling process, step 140 creates a new arc denominated ThisArc and steps 142 and 144 connect ThisArc head to ToBlk and tail to FromBlk substantially as shown. FIG. 7D is a flow chart diagram showing the details of new arc creation step 140 from FIG. 7B. Step 146 assigns the next free spot in the arc table to the new arc and step 148 initializes the ARC-WEIGHT parameter for the new arc to the largest possible value. FIG. 7E is a flow chart diagram showing the details of label association step 108 from FIG. 6. Step 104 tests for the existence of an unresolved reference to LABEL and initiates the FOR loop 145 to step through each ThisArc in the unresolved reference list. For each Arc in the unresolved list, step 149 sets the ArcHead to "currentBlock" and step 151 resets the Arc's ToLabel flag. After FOR loop 145 resets all ToLabel flags for the ArcHead block for every Arc linked to LABEL in the unresolved list, then step 147 associates LABEL with the current head block, thereby resolving the reference to LABEL.

FIG. 7C is a flow chart diagram showing the details of the control flow arc generation step 122 in FIG. 6, which begins at step 150 by testing the specified destination LABEL for association with some particular existing basic block node. If ToLabel is associated with a particular node, then step 152 loads that particular block into TargBlk and a new arc is added between FromBlk and TargBlk at step 154. If ToLabel is not associated with any particular node, then step 156 creates a new arc from FromBlk that remains unconnected at its head. Step 158 initializes the ToLabel flag for the new arc to TRUE and step 160 adds the orphaned arc to a list of unresolved arcs to which a label destination has been assigned.

After completion of CFG construction process 66 (FIG. 5), the tables of basic block nodes and interconnecting control flow arcs are processed by CFG annotation process 68, which is now described in connection with FIG. 8.

CFG annotation process 68 begins with the Depth-First Order (DFO) and Reverse DFO (RDFO) traverse process 162. Procedure 162 traverses the CFG to identify all basic block nodes in terms of control flow sequence from Entry Node to Exit Node and in reverse. After calculating the DFO and RDFO traverse node ordering within the CFG, a data flow analysis step 164 provides the live ranges of variables and parameters at each arc. Finally, the LIVESET and the MINWEIGHT is calculated for each control flow arc in steps 166 and 168. The processes in FIG. 8 are now described in connection with FIGS. 9-14.

Figure 8:
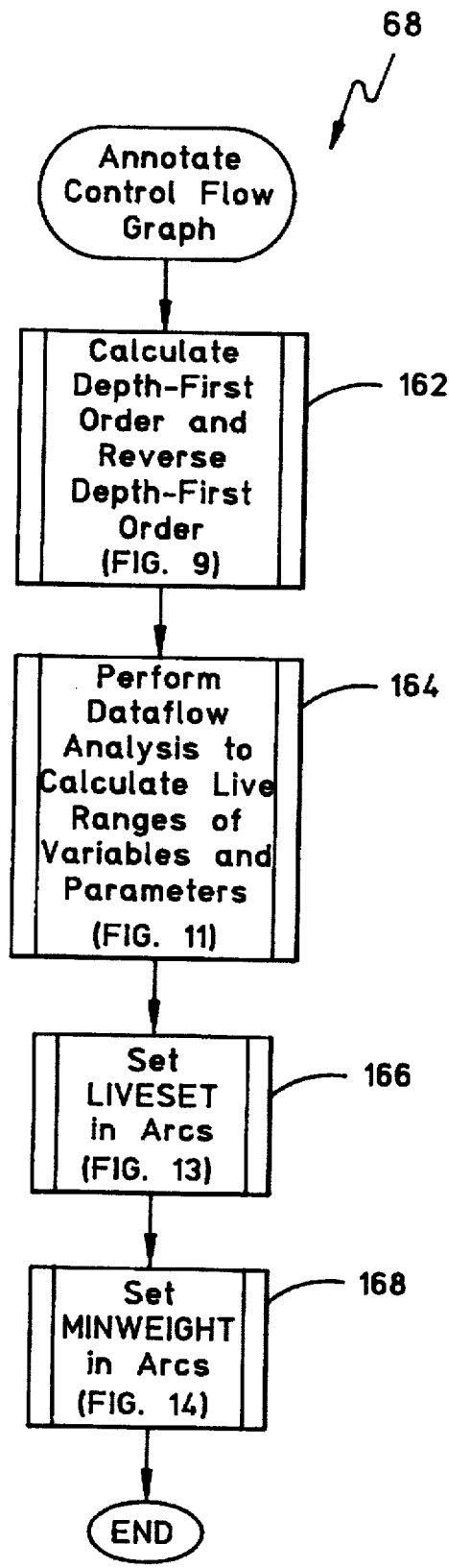
FIG. 8 is a flow chart diagram showing the CFG annotation method from FIG. 5.
Figure 9A:
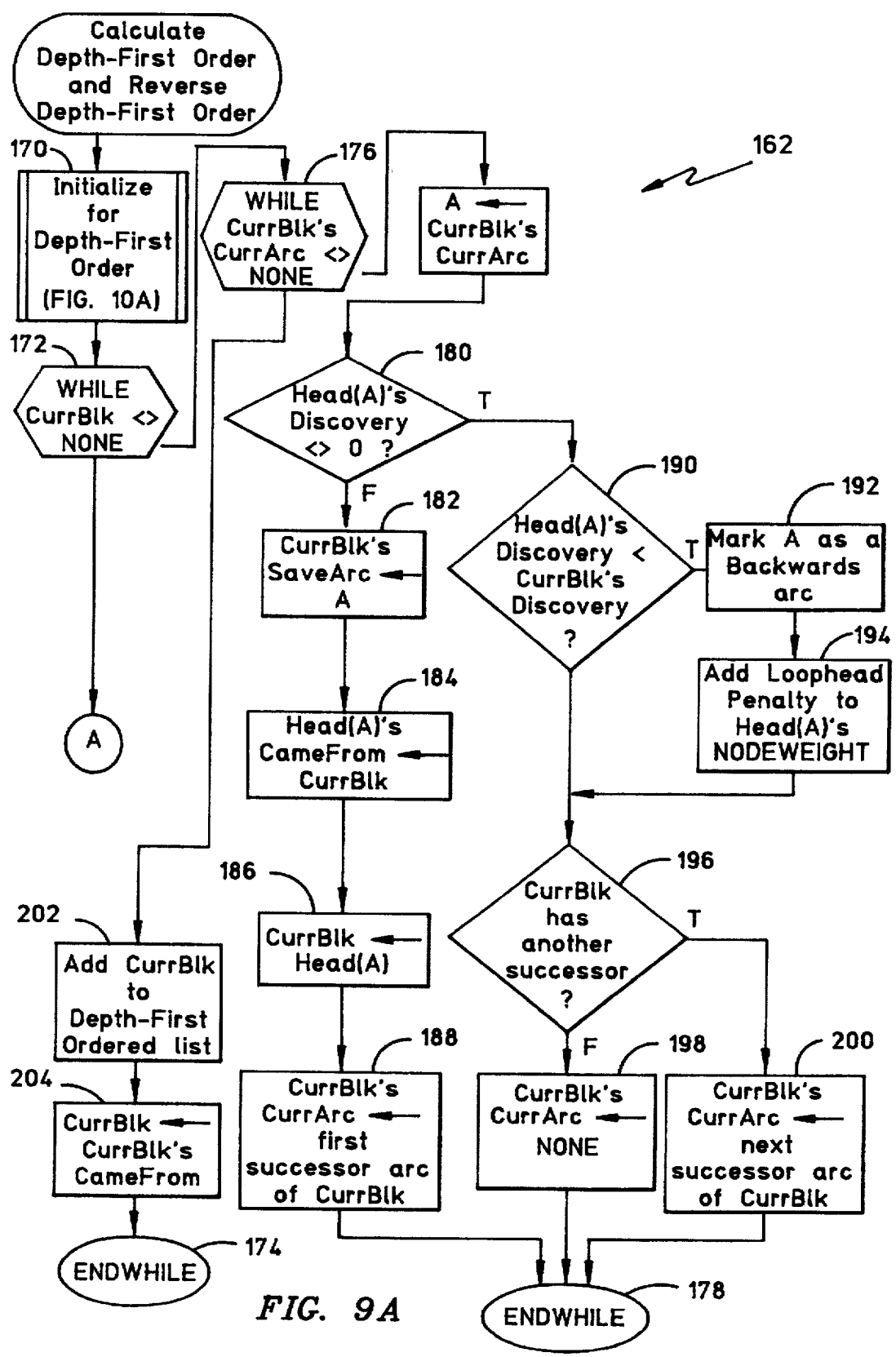
FIGS. 9A–9B, is a flow chart diagram showing the CFG order of calculation method from FIG. 8.
Figure 9B:
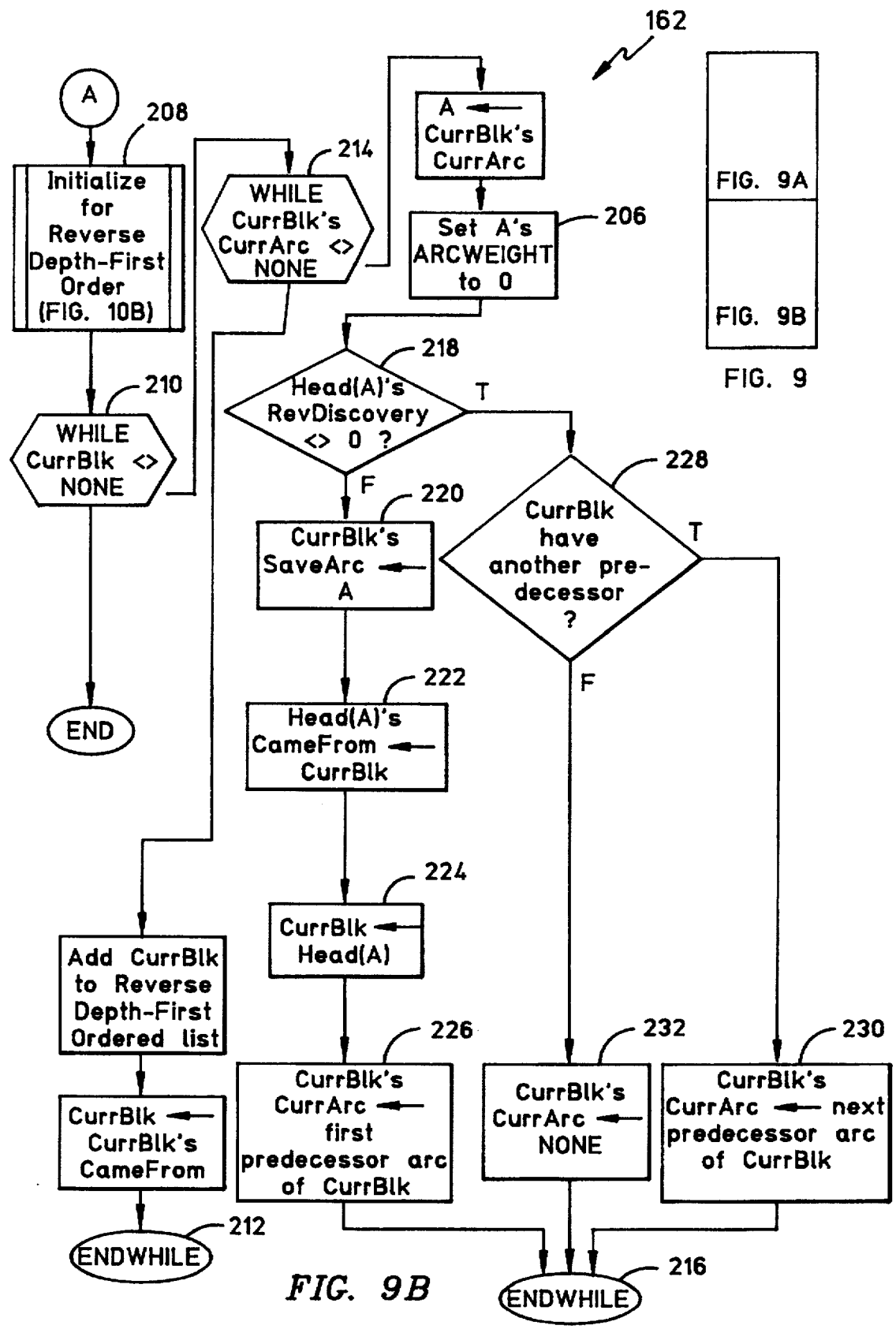

FIG. 9, comprising FIGS. 9A-9B, is a flow chart diagram showing the detailed operation of the DFO and RDFO CFG traverse process 162 in FIG. 8. Process 162 begins at step 170 with the initialization of the CFG for DFO traverse (FIG. 10A). After initialization, a WHILE loop 172 steps through the CFG until an empty CurrBlk brings it to an end at ENDWHILE 174. Within WHILE loop 172, a WHILE loop 176 steps through the arcs from CurrBlk until an empty CurrArc brings it to an end at the ENDWHILE 178. Within WHILE loop 176, the current arc is tested at step 180 to see if the Discovery counter for the basic block node to which this arc points (head node) is non-zero, thereby indicating that the head node has already been visited during the DFO traverse. If this is a first visit, step 182 saves the current arc A in SaveArc before marking the current block as the originating block (Tail(A) node) from which the current arc A arrives at the next Head(A) node. Step 186 then assigns the Head(A) node as the current block and step 188 selects the first successor arc from the new CurrBlk before cycling back to WHILE iterator 176.

If step 180 finds that the current arc head node (destination node) has already been visited during this DFO traverse because of a non-zero value for the Head(A) node Discovery flag, then step 190 compares the Head(A) node discovery flag with the current block node discovery flag. If the Head(A) node Discovery counter is less than the current block discovery counter, step 192 marks the current arc A as a backwards arc and step 194 adds a "Loophead" penalty to the Head(A) NODEWEIGHT. Step 196 then checks for another successor arc from the current block and, if none is found, step 198 vacates CurrArc before ending the inner loop and returning to WHILE iterator 176. If the current block has another successor arc, then step 200 assigns that new successor arc to CurrArc before returning to WHILE iterator 176. Upon termination of the inner loop, step 202 adds the current block to the current DFO ordered list with its accumulated block weight (NODEWEIGHT), and step 204 moves the next preceding basic block node into CurrBlk before returning to WHILE iterator 172.

Loophead penalty step 194 in FIG. 9A is significant to this invention because it operates to identify all CFG nodes that are control flow entries into a loop within the CFG. Otherwise, the remainder of the DFO traverse process discussed above in connection with FIG. 9A merely steps forward through the CFG to the exit node and then backs out looking for new forward paths until it stops, having backed out all the way to the entry (root) node. The RDFO process shown in FIG. 9B is similar except that the CFG traverse begins at the exit node and moves backward to the Entry Node before backing up while looking for other reverse paths until stopping at the Exit Node. A significant step in FIG. 9B is the ARCWEIGHT zeroing step 206, which sets the ARCWEIGHT to zero for every arc that is reachable along any reverse path from the exit node. Recall that step 148 (FIG. 7D) initializes each ARCWEIGHT to the highest possible value and recall that if the arc is not reachable from the exit, step 206 (FIG. 9B) cannot reset ARCWEIGHT to zero. Accordingly, any arc that is not reachable from the exit in a RDFO traverse must retain an infinite weight, ensuring that any subgraph including such an arc must always be rejected for in-line expansion.

In FIG. 9B, the RDFO traverse is initialized at step 208 (FIG. 10B) before beginning the outer WHILE loop 210 that ends at the ENDWHILE 212. Step 214 begins the inner WHILE loop that ends at ENDWHILE 216. Inner loop 214 iterates on the current are and, after step 206 zeros the ARCWEIGHT, step 218 tests the Reverse Discovery flag of the destination (head) node for the current arc to determine whether the node has previously been visited during the RDFO traverse. If the Reverse Discovery flag is zero, step 220 moves the current arc A into SaveArc before setting the CameFrom flag at step 222 to show that the arc arrives at Head(A) from the current block. Finally, step 224 assigns the archead block as the current block before resetting the current arc to the first successor are of the new current block at step 226. If the head block has already been visited during the reverse DFO, step 228 checks for another predecessor arc to the current block and loads the next predecessor are into CurrArc at step 230 (or NONE at step 230) before recycling inner WHILE loop 214.

FIGS. 10A and 10B are flow chart diagrams showing the traverse initialization processes 170 and 208, respectively, from FIG. 9. In process 170, step 234 clears the DFO block list before step 236 loads the CFG Entry Node into CurrBlk. Any CFG representing a procedure body considered for in-line expansion must have a unique Entry Node and a unique Exit Node. Step 238 initializes the CameFrom indicator for the current block (Entry Node) to NONE and step 240 sets a Counter to zero so that step 242 can initialize the Discovery flag for the current block by loading a Counter value. Finally, step 244 increments the Counter by one to show that the current block (Entry Node) has been once visited on this traverse and step 246 loads the first Entry Node successor arc into CurrArc to prepare for outer WHILE loop 172 in FIG. 9A. The reverse DFO initialization process 208 in FIG. 10B is substantially identical in principal to process 170 discussed above in connection with FIG. 10A.

Figure 11A:
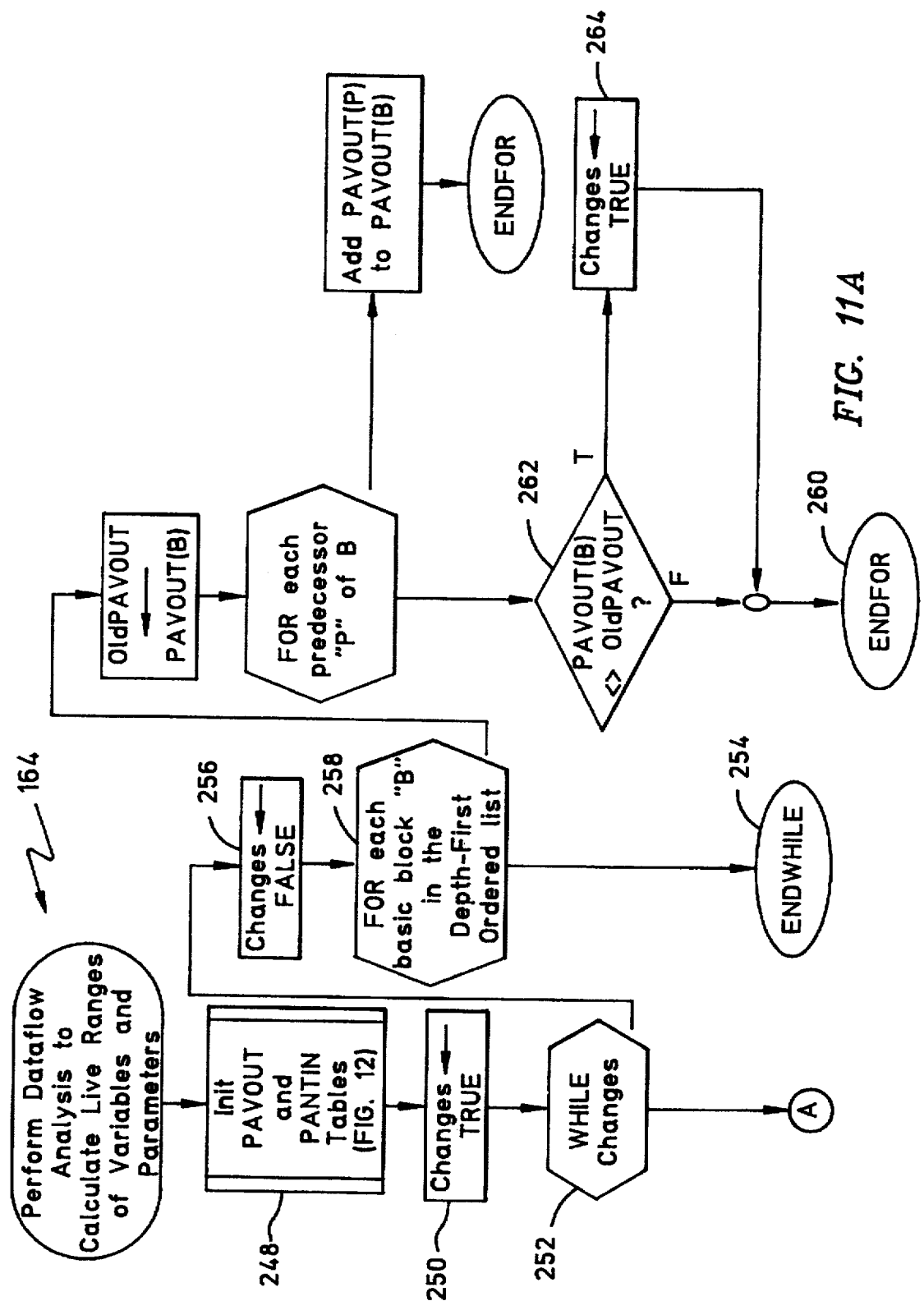
FIGS. 11A–11B, is a flow chart diagram showing the data flow analysis method from FIG. 8.
Figure 11B:
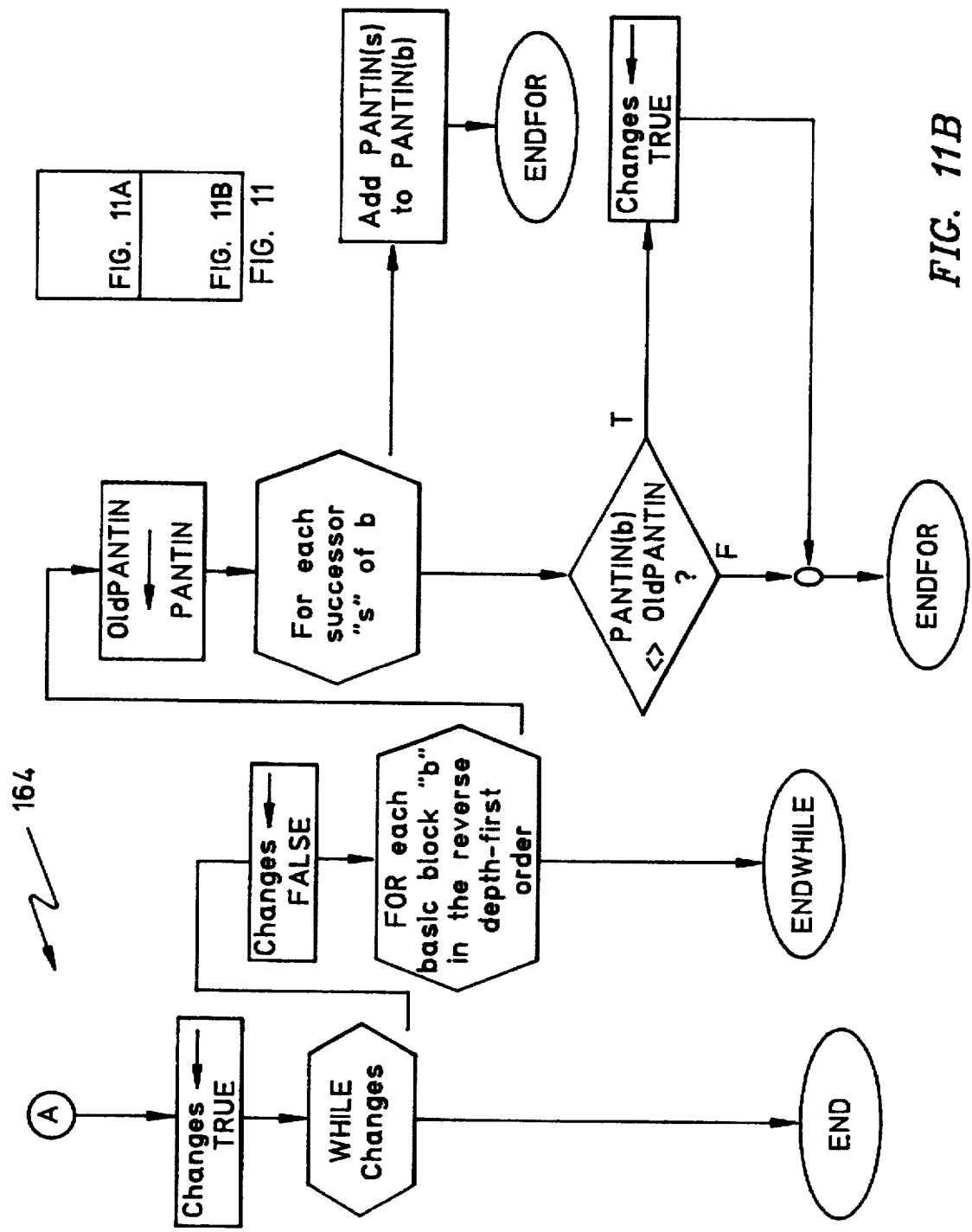
Figure 12:
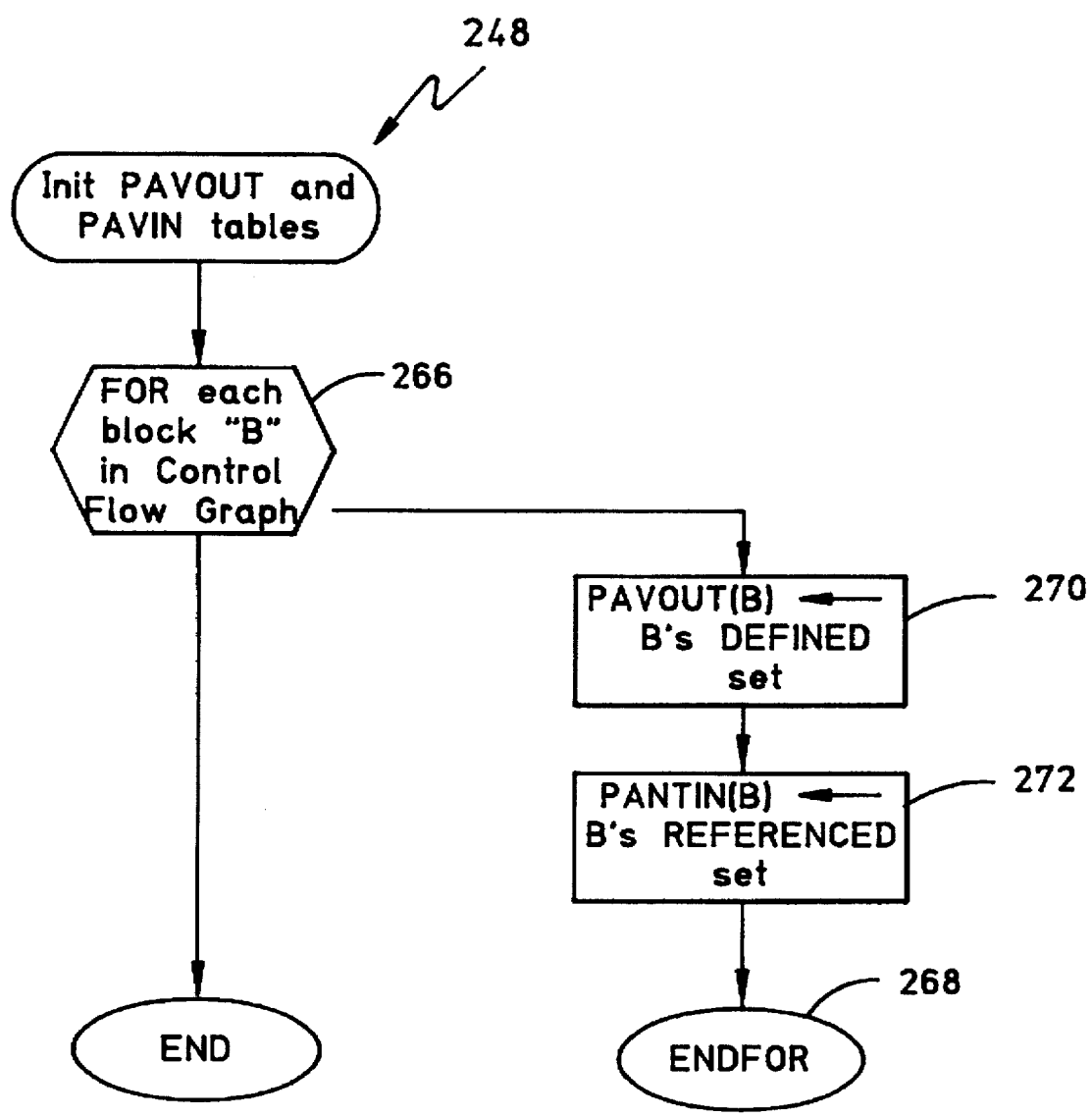
FIG. 12 is a flow chart diagram of the PAVOUT and PAVIN table initialization method from FIG. 11.

FIG. 11, comprising FIGS. 11A–11B, is a flow chart diagram showing the data flow analysis process 164 from FIG. 8, which is deferred until all basic block nodes in the procedure body CFG have been tabulated in DFO and RDFO order by traverse procedure 162. Process 164 begins at step 248 with the initialization of the PAVOUT and PANTIN tables (FIG. 12). The PAVOUT table contains a list of all variables and parameters that are "partially available" at an output are from a node, which includes those parameters and variables that are defined within the immediately preceding block. The PANTIN table contains a list of all variables and parameters that are "partially anticipated" at an arc into a node, which includes those variables and parameters that are referenced by the immediately subsequent block. Both the PAVOUT and PANTIN tables have the same width (number of attribute columns) as the number of variables and parameters (NumVars) and both include a single row for every basic block node in the CFG.

Figure 13:
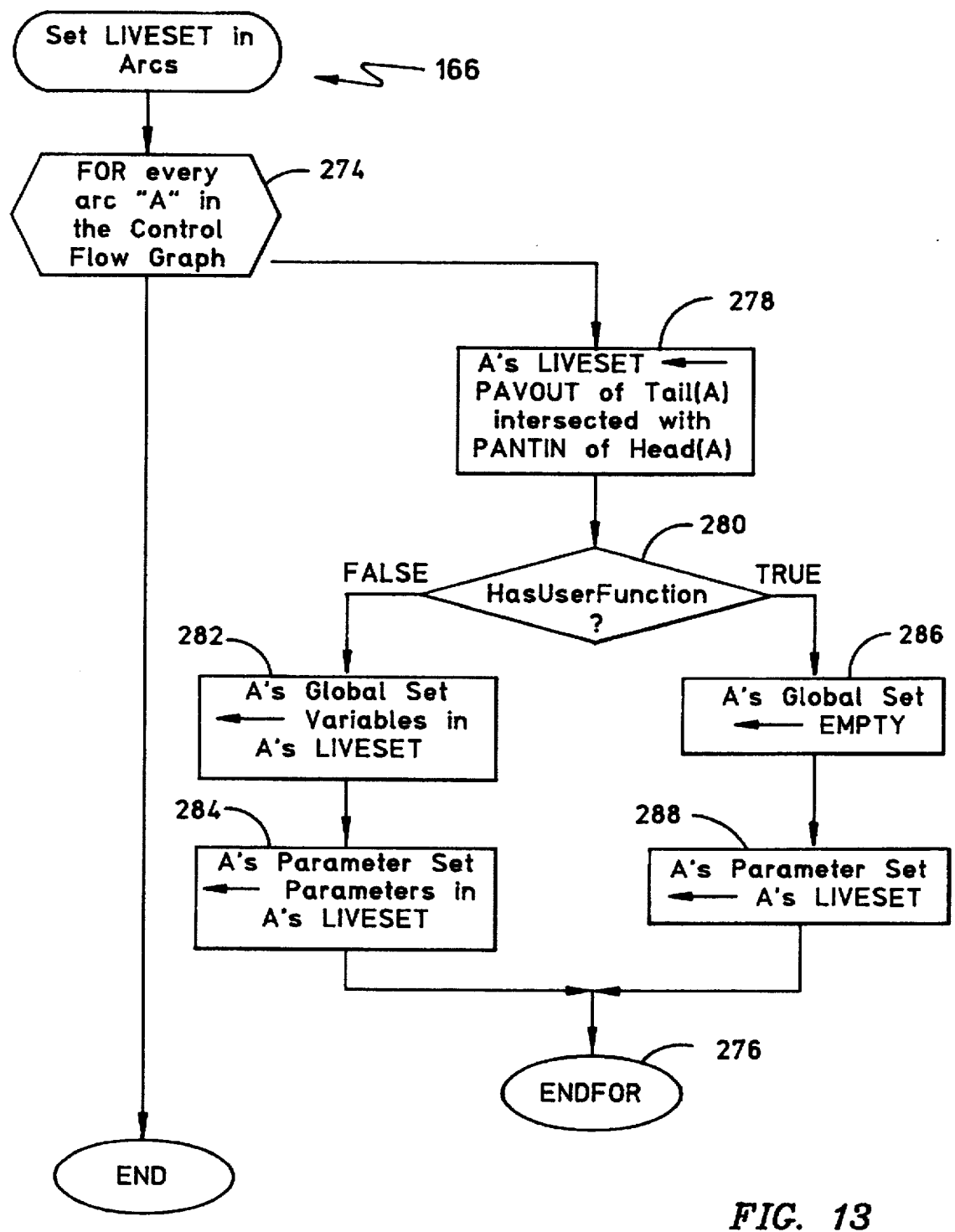
FIG. 13 is a flow chart diagram showing the LIVESET calculation method from FIG. 8.

Following initialization, step 250 sets a Changes flag to TRUE before beginning an outer WHILE loop at step 252 that ends at ENDWHILE 254 only after the inner FOR loop 258 quiesces. Step 256 resets the Changes flag to FALSE before starting the inner FOR iterator 258. Inner FOR loop 258 steps through the DFO'd node list and adds "partially available" parameters to the PAVOUT table. With each iteration, step 262 checks for changes in the PAVOUT table and step 264 resets the Changes flag to TRUE if changes are found. Once inner loop 258 quiesces, step 264 is bypassed and the earlier resetting of the Changes flag at step 256 ends outer WHILE loop 252. FIG. 11B shows a similar RDFO process for the "partially anticipated" parameters and variables that must be added to the PANTIN table. The process shown in FIG. 11B is substantially identical in principal to that discussed above in connection with FIG. 11A and may be fully appreciated with reference thereto. FIG. 12 is a flow chart diagram of the PAVOUT and PAVIN table initialization process 248 from FIG. 11. The FOR iterator 266 that ends at ENDFOR 268 steps through every basic block node within the CFG to preload the PAVOUT table with the DEFINED parameter set for each basic block at step 270 and to preload PANTIN table with the REFERENCED parameter set for each basic block at step 272. Recall that these two parameter sets were assigned to each node in process 66 (FIG. 6A). FIG. 13 is a flow chart diagram of the LIVESET calculation process 166 from FIG. 8. Process 166 creates a LIVESET of parameters and variables for each arc in the CFG. The FOR iterator 274 loops on every arc, ending at the ENDFOR 276. For each arc A, step 278 calculates the intersection of the "available parameters" (PAVOUT) of the Tail(A) node (from which A originates) with the "anticipated parameters" (PANTIN) of the Head(A) node (at which A ends). This creates the LIVESET for are A, which includes the variables and parameters that "live" on arc A. Step 280 then tests the HasUserFunction flag and, if false, step 282 moves A's LIVESET variables into A's GlobalSet and step 284 moves A's LIVESET parameters into A's ParameterSet. If the procedure body has no user defined function calls, then step 286 leaves A's GlobalSet empty and moves the entire LIVESET into A's ParameterSet. Thus, if there are no user function calls, the LIVESET auto variables move out to global static storage and the parameters to the original procedures must now be treated as parameters for the out-of-line procedure as well. FIG. 14, comprising FIGS.

Figure 14A:
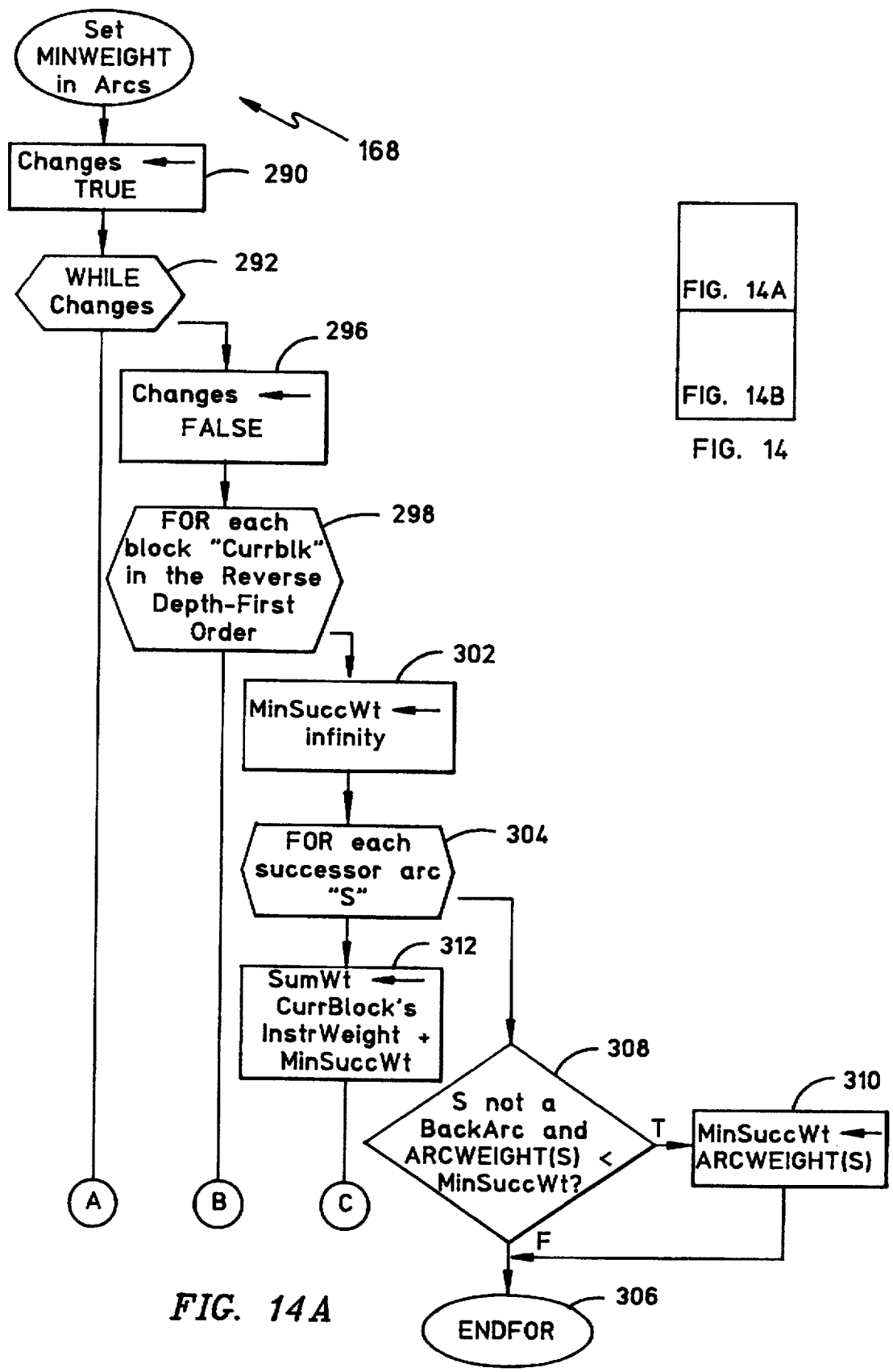
FIGS. 14A–14B, is a flow chart diagram showing the arc MINWEIGHT calculation method from FIG. 8.
Figure 14B:
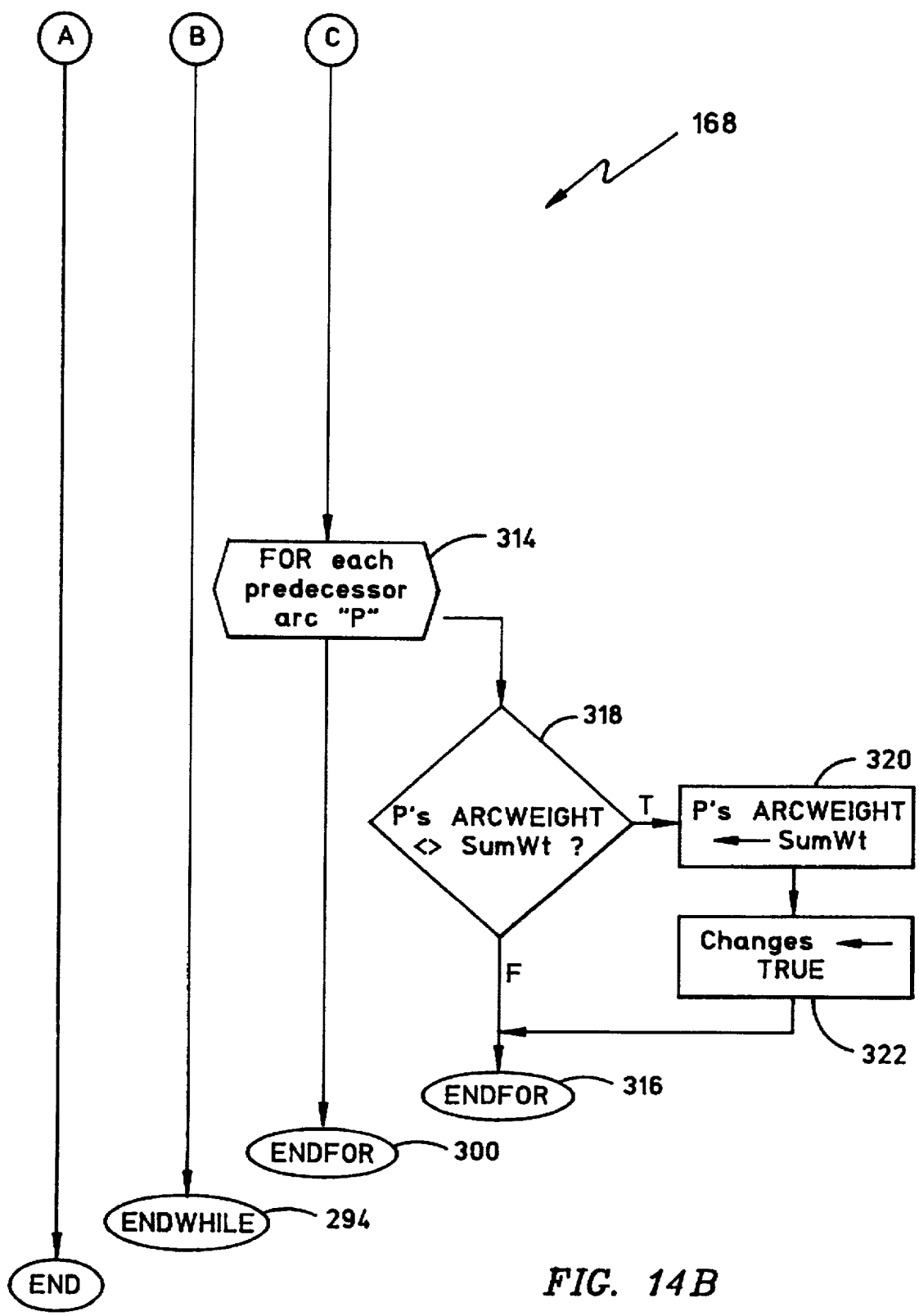

14A–14B, is a flow chart diagram of the arc MINWEIGHT calculation process 168 from FIG. 8. This can be simply viewed as a process whereby each arc within the CFG is assigned an ARCWEIGHT that represents the accumulated NODEWEIGHTs in a subgraph extending from the arc. Process 168 essentially searches for the "cheapest" route through the CFG by moving along the path having the lowest ARCWEIGHT out of a node while adding the output arc ARCWEIGHT to the tail node NODEWEIGHT and forcing all predecessor arc ARCWEIGHTS equal to the modified tail node NODEWEIGHT. This process iterates until it quiesces. A Changes flag is first initialized to TRUE at step 290 before the WHILE loop 292 that ends at ENDWHILE 294 (FIG. 14B). Within outer WHILE loop 292, step 296 resets the Changes flag to FALSE to initialize the FOR loop 298 that ends at ENDFOR 300 (FIG. 14B). Within FOR loop 298, for each current block in the RDFO traverse of the CFG, step 302 initializes MinSuccWt to the highest possible value to initialize the inner FOR loop 304 that ends at ENDFOR 306. Within inner FOR loop 304, step 308 tests each successor arc "S" so that if S is not a BackArc and if the ARCWEIGHT of successor arc S is less than MinSuccWt, then MinSuccWt is reset to the ARCWEIGHT of successor arc S at step 310. When inner FOR loop 304 ends, step 312 resets the SumWt to the sum of the accumulated instruction weights within the current block (recall step 96 in FIG. 6A) plus the minimum successor ARCWEIGHT out of the current block (MinSuccWt). In FIG. 14B, a second inner FOR loop 34 that ends at ENDFOR 316 steps through each predecessor arc P, which is tested at step 318 to force its ARCWEIGHT to be equal to the SumWt accumulated at step 3 12 (FIG. 14A). If P's ARCWEIGHT is not equal to SumWt, then step 320 assigns SumWt to force this equality and step 322 resets the Changes flag to TRUE before cycling inner FOR loop 314 at ENDFOR 316.

Figure 15:
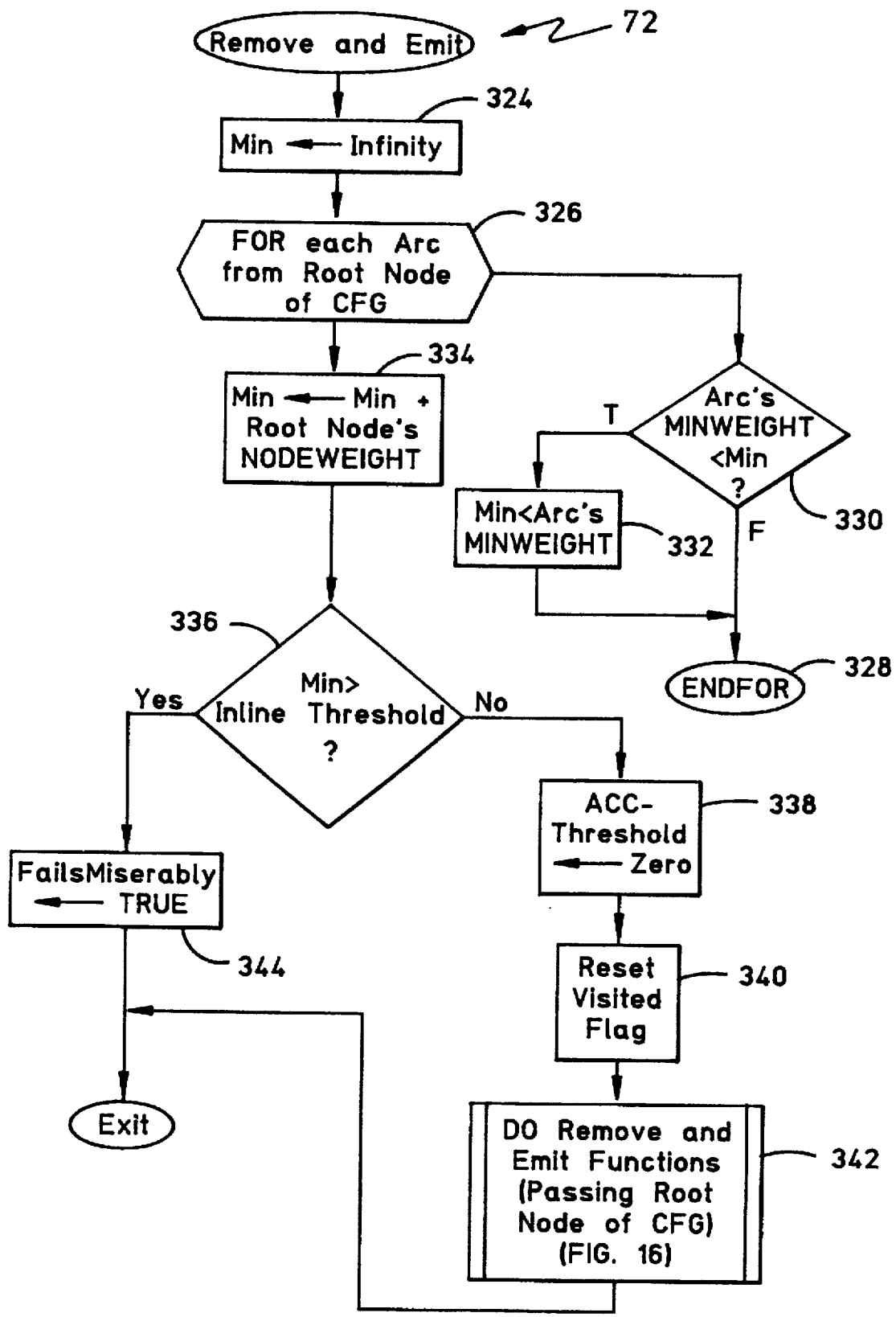
FIG. 15 is a flow chart diagram showing the subgraph emission method from FIG. 5.

FIG. 15 is a flow chart diagram of the Remove and Emit process 72 from FIG. 5. Process 72 first sets a Min variable to the maximum possible value at step 324 to initialize the outer FOR loop 326 that ends at ENDFOR 328. FOR loop 326 tests the MINWEIGHT for each arc in the CFG against the Min value at step 330 and resets Min to the MIN-WEIGHT of any arc that does not exceed the current value of Min at step 332. When FOR loop 326 finishes, step 334 adds the Entry Node NODEWEIGHT to Min and step 336 tests this accumulated Min value against an in-line threshold that may be either predetermined or dynamically adjusted responsive to changes in execution cost objectives. If this in-line threshold is not exceeded, then step 338 initializes the ACCThreshold to zero. Step 340 resets the Visited Flag before calling the actual remove and emit functions 342. If step 336 fails, then step 344 sets the FailsMiserably flag to TRUE before exiting, which effectively halts any further in-line expansion activity for this procedure body.

Figure 16:
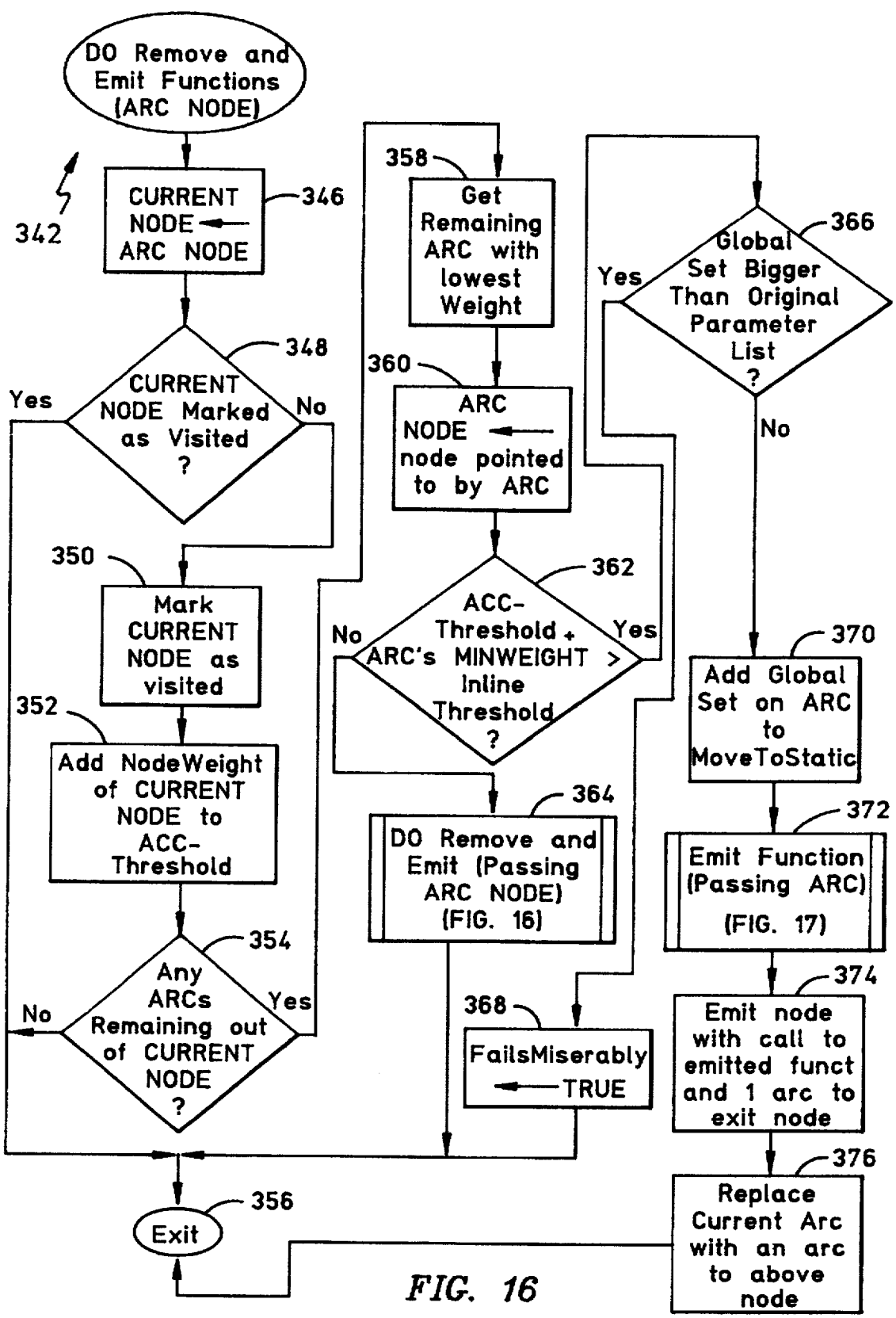
FIG. 16 is a flow chart diagram showing the remove and emit methods from FIG. 15.

FIG. 16 is a flow chart diagram showing the remove and emit process 342 from FIG. 15. Process 342 operates on an Arc Node passed by the function call. The first function calls the passes the CFG Entry(Root) Node and later calls pass various basic block nodes from the CFG. Many of these function calls are nested within function 342. Step 346 first assigns the Arc Node as the current node for the subsequent procedure. Step 348 tests the current node Visited Flag. If the current node has not yet been visited, step 350 sets its Visited Flag, after which step 352 adds the NODEWEIGHT of the current node to ACCThreshold. Step 354 then tests for any other unvisited arcs out of the current node. If step 348 finds that the current node has already been visited, or if step 354 finds no other unvisited arcs out of the current node, then function 342 exits at step 356. If step 354 discovers other arcs out of the current node, then step 358 selects from among these unvisited arcs that with the lowest ARC-WEIGHT and step 360 assigns the node at the head of this selected arc as the new Arc Node, replacing the Arc Node passed into process 342. Step 362 then tests the sum of the ACCThreshold and the MINWEIGHT of the arc selected in step 358 to determine whether this sum exceeds the in-line threshold discussed above in connection with step 336 of FIG. 15. If the in-line threshold is not exceeded, then step 364 makes a nested call to Remove and Emit function 342 while passing the current Arc Node. If step 362 finds that the in-line threshold is exceeded by the accumulated ARCWEIGHTS, then step 366 tests the Global Set to determine whether it is larger than the original parameter list. If it is, then step 368 sets the FailsMiserably flag to TRUE and exits at step 356, thereby effectively ending any further in-line expansion activity for this procedure body. If step 366 finds that the original parameter list size is improved by replacing it with a smaller Global Set, then step 370 adds the Global Set for the current arc to MoveToStatic before passing the current arcs to the Emit Function 372 discussed below in connection with FIG. 17. After subgraph rooted in the current node is emitted in function 372, step 374 adds a procedure call instruction to the CFG and connects it to the CFG Exit Node. Finally, step 376 removes the current arc and replaces it with an arc to the new procedure call node added in step 374 before exiting at step 356.

When step 362 finds that the in-line threshold is exceeded, then it has successfully qualified a subgraph rooted at the current node that must be removed from the procedure body to reduce chances of another rejection of the procedure body by the in-line expansion process. Step 370 adds the Global Set to the static list because there may be several different subgraphs emitted from the CFG and all must be made static. When step 376 removes the current arc, the process may "orphan" a significant portion of the original CFG, which is an appropriate result.

Figure 17:
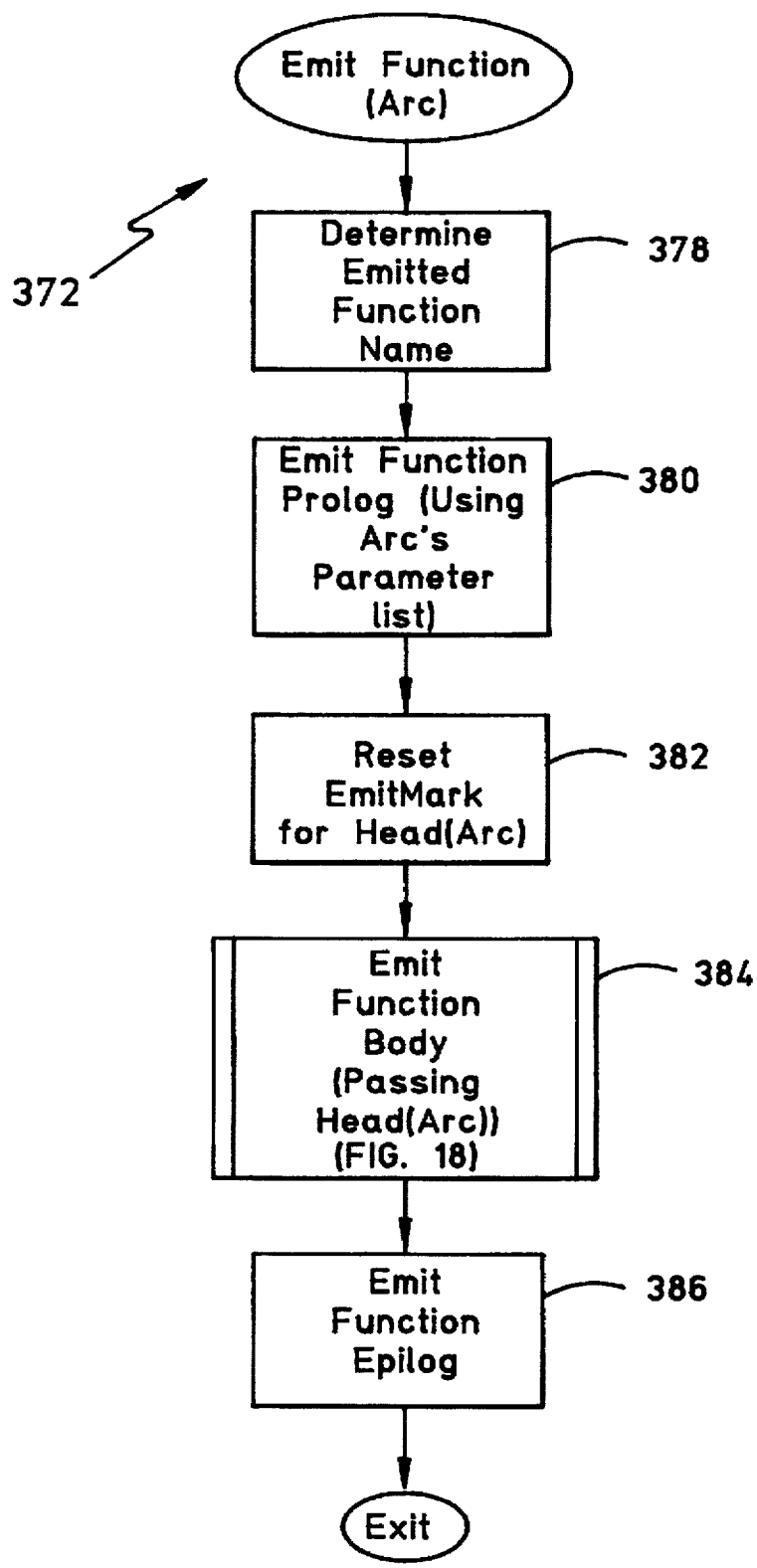
FIG. 17 is a flow chart diagram showing the emit function from FIG. 16.

FIG. 17 is a flow chart diagram showing Emit Function 372 from FIG. 16. Step 378 determines a function name to represent the emitted subgraph for use by the linker and step 380 executes an Emit Function Prologue that loads the LIVESET parameters annotated on the Arc passed to function 372. Step 382 resets the EmitMark to initialize the Emit Function Body 384, which passes the basic block node to which Arc points (the head node for the Arc). After completion of Emit Function Body 384, step 386 executes an Emit Function Epilogue that handles the return value bookkeeping.

Figure 18:
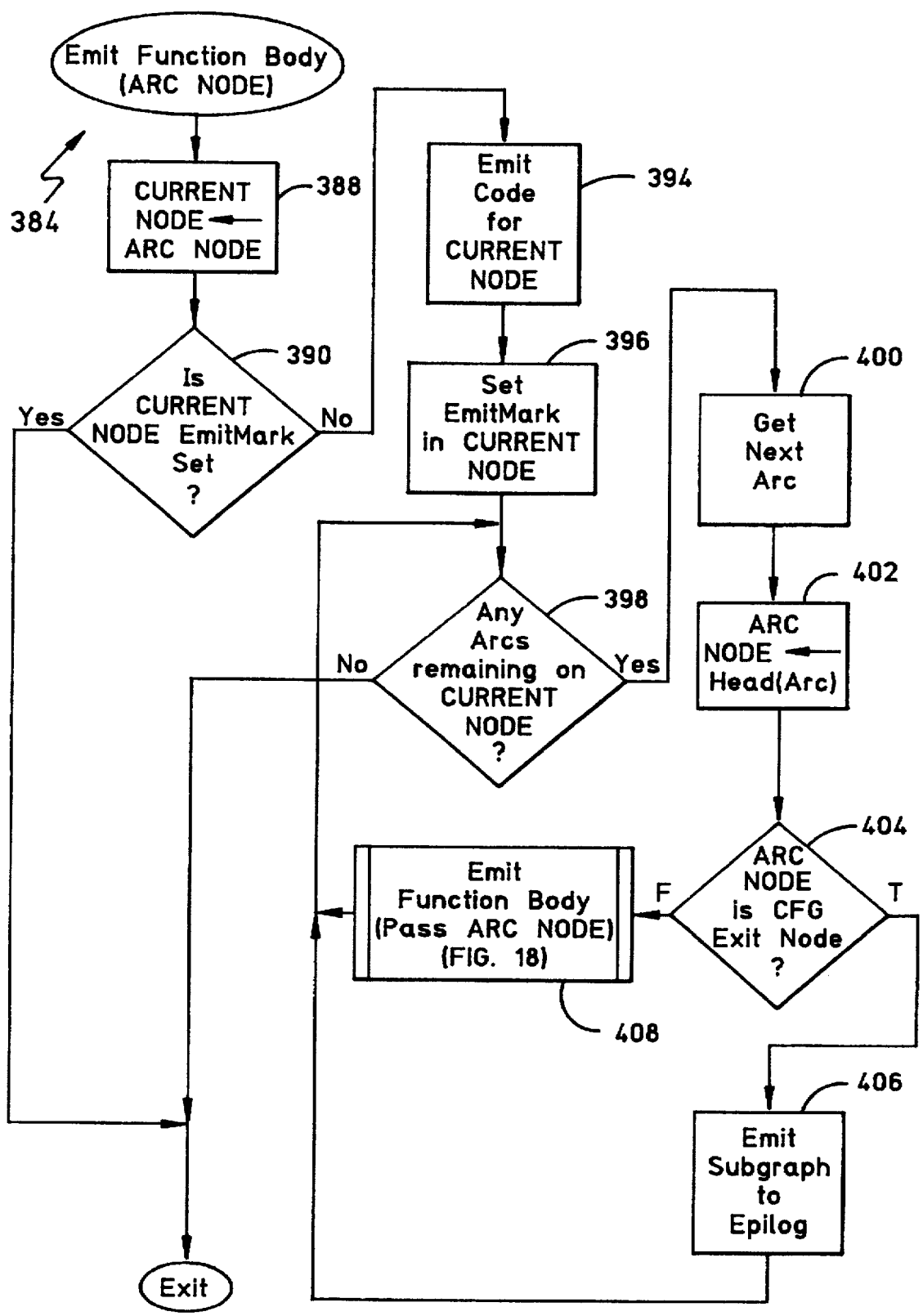
FIG. 18 is a flow chart diagram showing the emit function body from FIG. 17.

FIG. 18 is a flow chart diagram showing the Emit Function Body process 384 from FIG. 17, which begins by assigning the Arc Node passed with the function call as the Current Node in step 388. Step 390 then tests the EmitMark to determine whether the current node has already been visited, and immediately exits at step 392 if so. If not, step 394 emits the immediate code for the current basic block node into a new procedure body. Step 394 may need to repair the Dictionary references to the Global Store and perform other housekeeping details. Step 396 then sets EmitMark to show that the current node has been visited and emitted. Step 398 then checks for any remaining arcs from the current node and exits at step 392 if none are found. If arcs remain, step 400 gets the next arc, and step 402 assigns the head node of the next arc as the Arc Node. Step 404 tests the new Arc Node to determine if it is the CFG Exit Node and, if so, step 406 emits the complete subgraph to Emit Function Epilogue 386 (FIG. 17). If Arc Node is not the Exit Node, then step 408 makes a nested call to Emit Function body process 384, passing the current Arc Node. After the needed call returns, step 398 checks for additional arcs out of the current node and the process continues through the entire CFG from the Entry Node passed from the original call in FIG. 17. The arc MINWEIGHTs are of no concern to the arc selection step 398.

Figure 19:
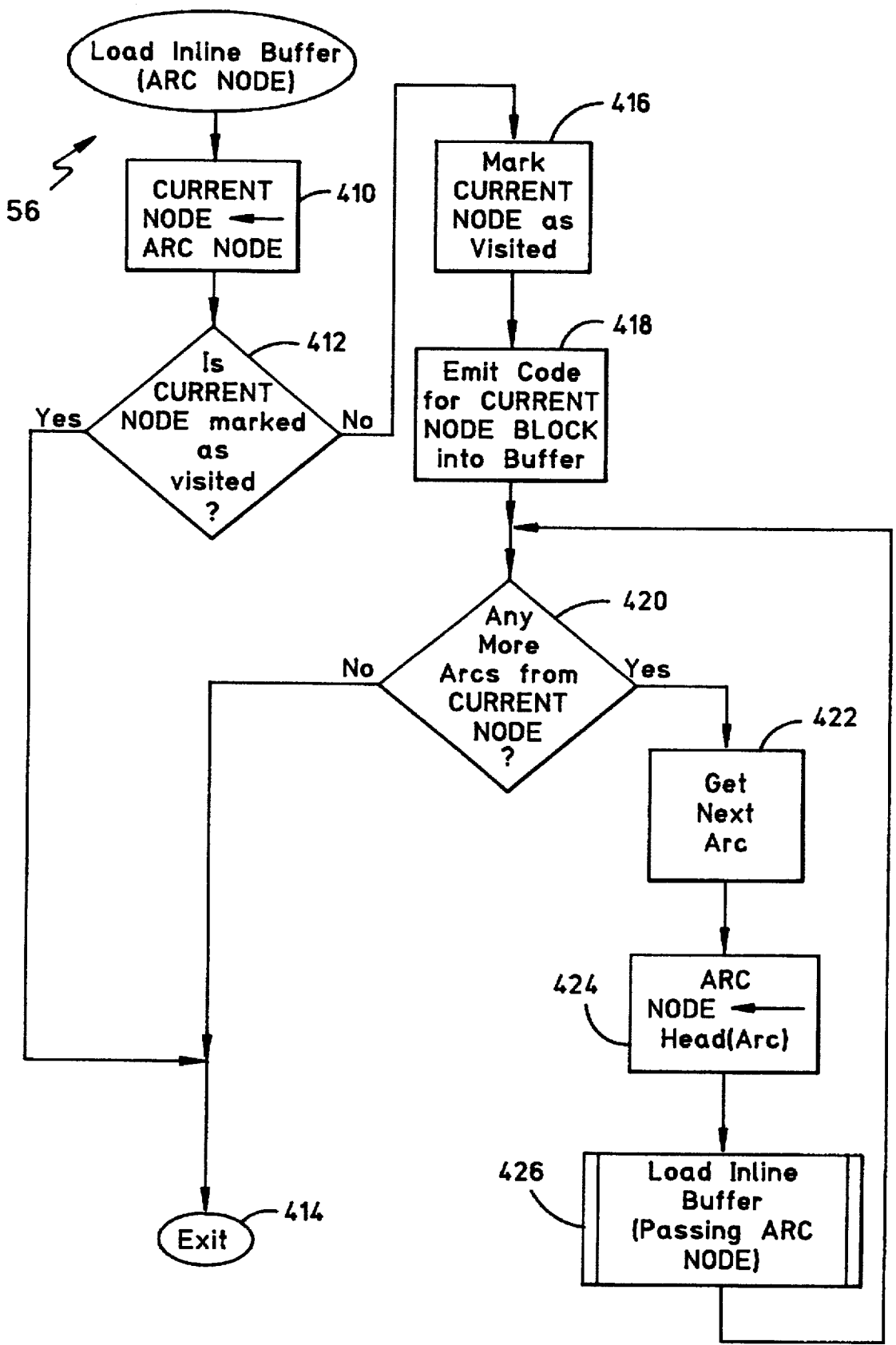
FIG. 19 is a flow chart diagram showing the in-line buffer loading method from FIG. 5.

FIG. 19 is a flow chart diagram of the in-line buffer loading process 56 from FIG. 5. Step 410 assigns as the current node the Arc Node passed with the function call. Step 412 tests the Visited Flag for the current node and immediately exits at step 414 if the current node has already been marked as visited. If not, step 416 marks the current node by setting the Visited Flag and step 418 emits the immediate code for the basic block represented by the current node into the in-line buffer. Step 420 tests for more arcs from the current node and, finding none, exits at step 414. If another are is found, step 422 gets the next arc and step 424 assigns as the Arc Node the head node pointed to by the next are before making a nested call to process 56 at step 426. Because of the nesting effect of step 426, process 56 traverses the entire CFG before exiting at step 414 but cannot visit any of the basic block nodes decoupled (emitted) by step 376 in FIG. 16. Because of the subgraph emissions made above responsive to ARCWEIGHTS that exceed an in-line threshold, the reduced procedure body can sometimes be expected to avoid rejection when fully loaded into the in-line buffer.

A Partial In-Line Expansion Example

The above description of a preferred embodiment of the partial in-lining method of this invention can be better appreciated with reference to the following example. Consider the following source code listing of a computer program denominated "main":

```
main ()
{
    int i;
    int x;
    x = 2;
    i = f(x);
}
```

As the full in-line expansion means proceeds through program "main", it encounters the "i=f(x) procedure call, whereupon the program body corresponding to the f(x) procedure call is retrieved and an attempt made to fully "in-line" the procedure body code. For this example, the following source code for the f(x) procedure body is assumed: fix)

```
f(x)
{
    int i;
    int j;
    IF (x > 1)
    {
        i = 0;
        WHILE (i < x)
        {
            j = i;
            i = i + 1;
        }
    }
    ELSE
        i = x;
    return i
}
```

Figure 20A:
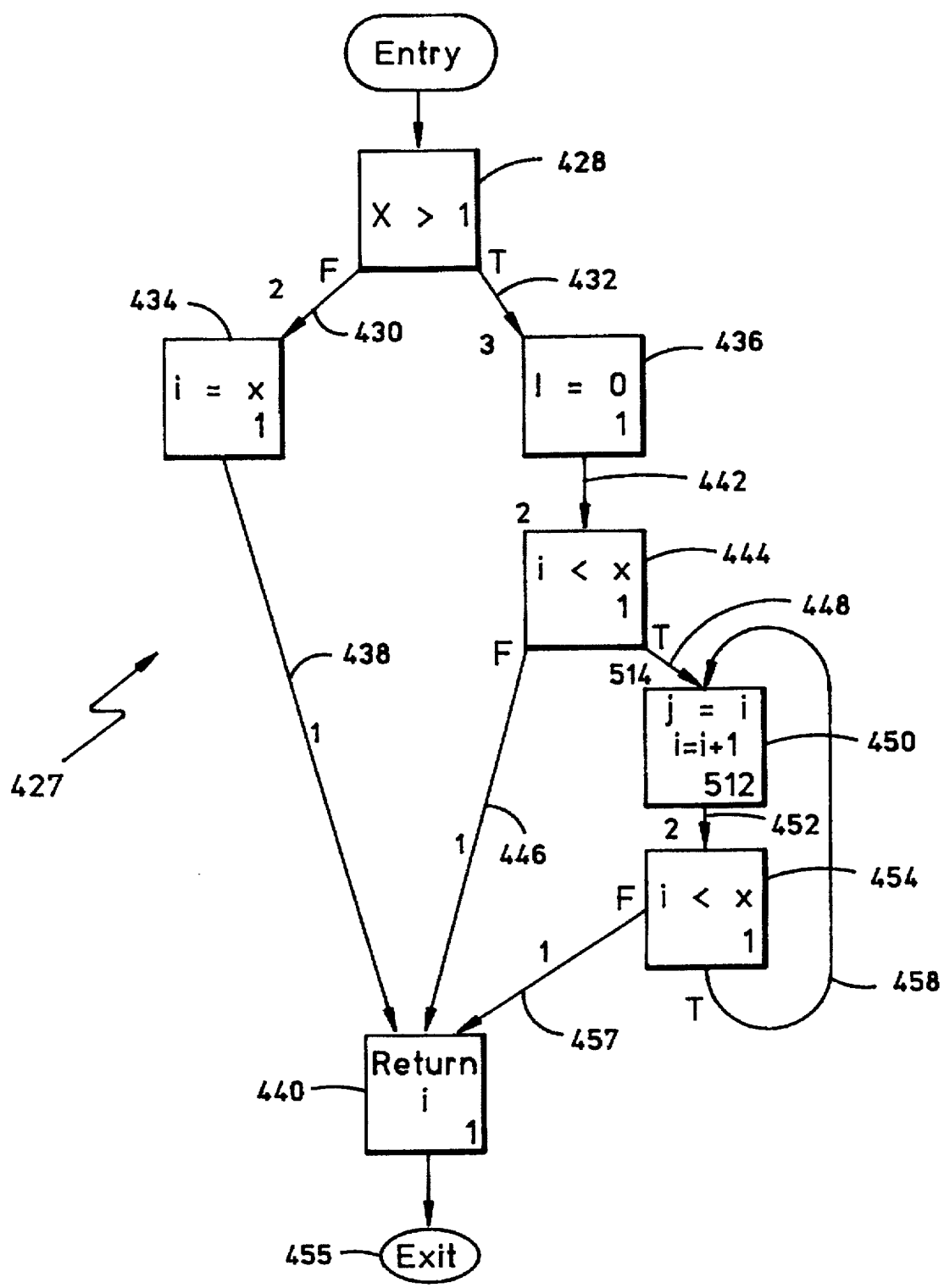
FIGS. 20A-20C are CFG diagrams illustrating a partial in-line expansion example.

Because this example includes an inner WHILE loop with a recursive instruction, the entire procedure body is rejected in our example as "too expensive" for full in-line expansion at step 54 and the body reduction procedure 60 is started in accordance with this invention. FIG. 20A shows the control flow graph (CFG) for the f(x) procedure body, including several basic block nodes containing program instructions connected to one another by control flow arcs. For instance, the CFG entry node 427 connects to a node 428 that includes all procedure body instructions from the beginning until the basic block is terminated by a conditional branch. Node 428 is the "tail" node for the two arcs 430 and 432. Arc 430 refers to its "head" node 434 and arc 432 refers to its head node 436. Node 434 is the tail node for the control flow arc 438, which refers to its head node 440. Node 440 connects with Exit Node 455. Similarly, arc 442 connects its tail node 436 to its head node 444. Node 444 includes a conditional branch instruction that generates two output arcs 446 and 448. Arc 446 terminates at its head node 440 and arc 448 connects to its head node 450. Output arc 452 connects from its tail node 450 to its head node 454, which includes the inner-loop conditional branch statement. Node 454 originates two output arcs 457 and 458, the second of which is a loop arc that returns control back to the earlier node 450. Strictly speaking, nodes 436 and 444 constitute a single "basic block", as do the two nodes 450 and 454, according to the formal definition of a basic block known in the art. For the purposes of this example, however, the conditional branch statements are illustrated as separate nodes in the control flow graph for f(x).

CFG 427 is constructed from the above procedure body code example in accordance with CFG construction process 66 discussed above in connection with FIG. 6, wherein NODEWEIGHTS are assigned at step 96 (FIG. 6A). Node 450 is assigned a NODEWEIGHT of 512 it is at the head of a back arc (a loophead). This heavy value is assigned as a "LOOPHEAD" penalty because node 450 is the "head" node of back arc 458. All other nodes are assigned the NODEWEIGHT value of "one" to represent the relative cost of executing the single instruction within each node.

After completion of CFG construction process 66 (FIG. 6), CFG annotation process 68 (FIG. 8) is performed. The depth-first ordering (DFO) and reverse depth-first ordering (RDFO) of the nodes and arcs in CFG 427 are determined in process 162 (FIG. 9). Data flow analysis and LIVESET determination is made for each of the arcs in steps 164 and 166 of FIG. 8. Finally, the MINWEIGHTs of all arcs are computed in process 168, which is discussed above in connection with FIG. 14. Process 168 can be simply exemplified in connection with FIG. 20A as follows: Beginning with node 440, a NODEWEIGHT=1 is assigned (back-propogated) to the three incoming arcs 438, 446 and 457. Moving in RDFO along arc 438, the NODEWEIGHT for node 434 is added to the ARCWEIGHT of arc 438 to compute ARCWEIGHT=2 for arc 430. Similarly, the ARCWEIGHT of arc 446 is added to the NODEWEIGHT of node 454 to obtain ARCWEIGHT=2 for arc 452 and so forth. Arc 442 has a MINWEIGHT=2 because this represents the minimum of the two paths to the end of the procedure. Arc 458 has no weight because the procedure of this invention instead adds a "LOOPHEAD" penalty to head node 450 (recall step 194 in FIG. 9A). A result of this CFG annotation process is a very high MINWEIGHT=514 at arc 448 and a relatively low MINWEIGHT=1 at arc 446. This relative difference in MINWEIGHTs governs the subsequent subgraph emission process 72 discussed above in connection with FIG. 15.

Returning to FIG. 20A, Remove and Emit process 72 first begins at Entry Node 427 and moves there from to node 428 where the lower of the two MINWEIGHTs is selected as the first path, which is arc 430. Moving from node 428 along arc 430 to node 434, the procedure continues along arc 438 to node 440, and therefrom to Exit Node 455 while finding nothing that qualifies for emission according to the method of this invention. In this example, the "in-line threshold" is assumed to be 512. This process occurs recursively as Remove and Emit process 72 makes nested calls to itself (step 364 in FIG. 16). After finding this first complete path from entry node 427 to exit node 455, process 72 backs up to node 440 and node 434, finds no other path, backs up to node 428 and selects the next higher MINWEIGHT arc, which is arc 432. Similarly, arc 432 is followed to node 436 because the MINWEIGHT of arc 432 is less than the threshold. Arc 442 is then followed to node 444 because the MINWEIGHT of arc 442 is less than the threshold. Because the arc 448 MINWEIGHT exceeds the threshold (514 >512), the subsequent subgraph rooted at head node 450 is qualified for emission by emit function 372 (FIG. 17). A summary emission to Exit Node 455 is preferred because of the simplicity of later linkage activities, although an even smaller subgraph may in theory be qualified for emission in accordance with the method of this invention while yet avoiding rejection of CFG 427 during later in-line expansion.

Figure 20B:
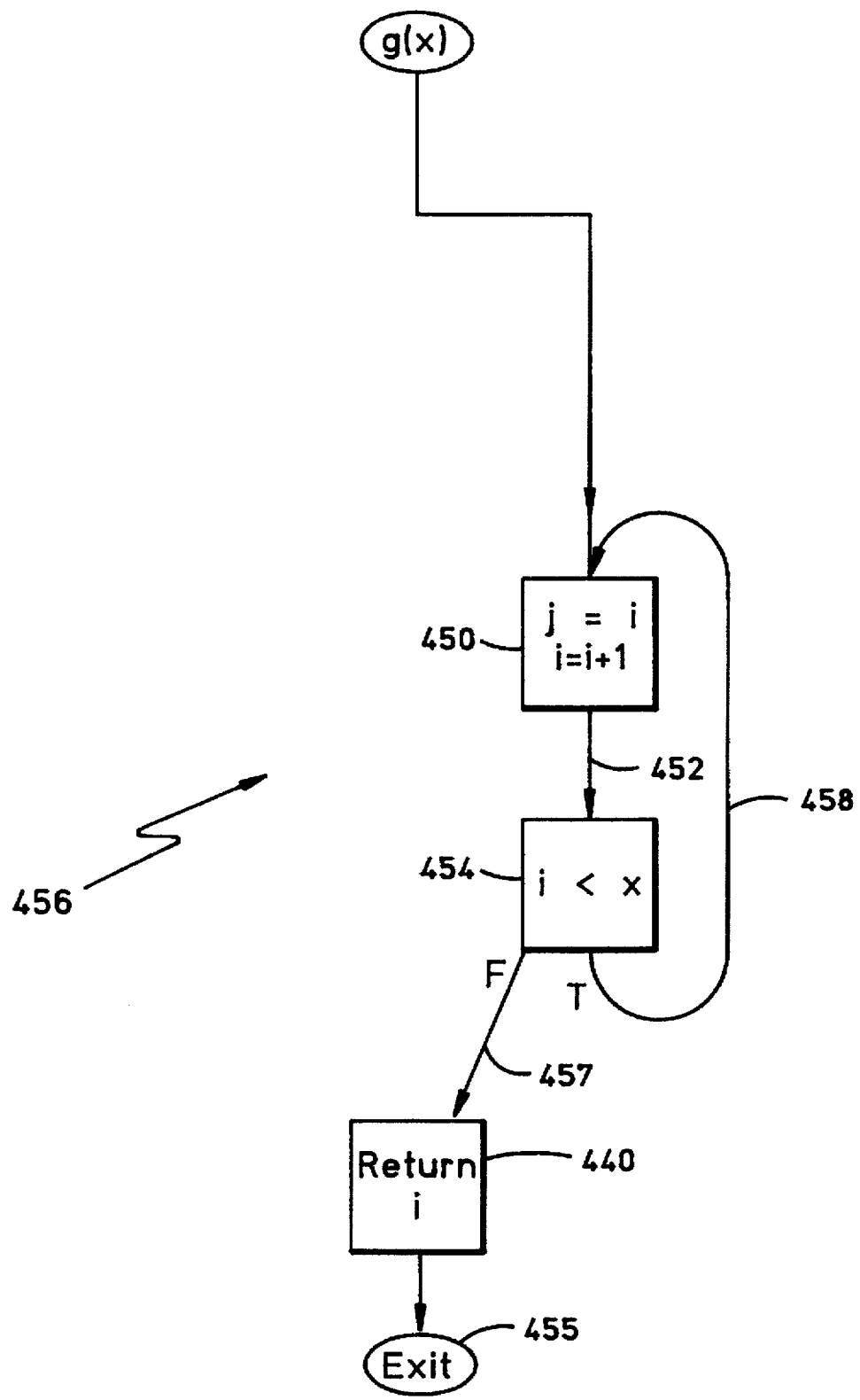

FIG. 20B shows the emitted subgraph 456, which includes everything on all paths between the CFG Exit Node and the head node (node 450) of the first DFO arc (arc 448) that is qualified because of an excessive MINWEIGHT. Subgraph 456 ends at the parent CFG Exit Node 455. In the upper limit, the entire CFG 427 can be "emitted", which leads to the test at step 336 in FIG. 15 setting the FailsMiserably flag. However, in this example, emission of subgraph 456 leaves a significant portion of the original CFG 427 for "partial" in-line expansion.

Figure 20C:
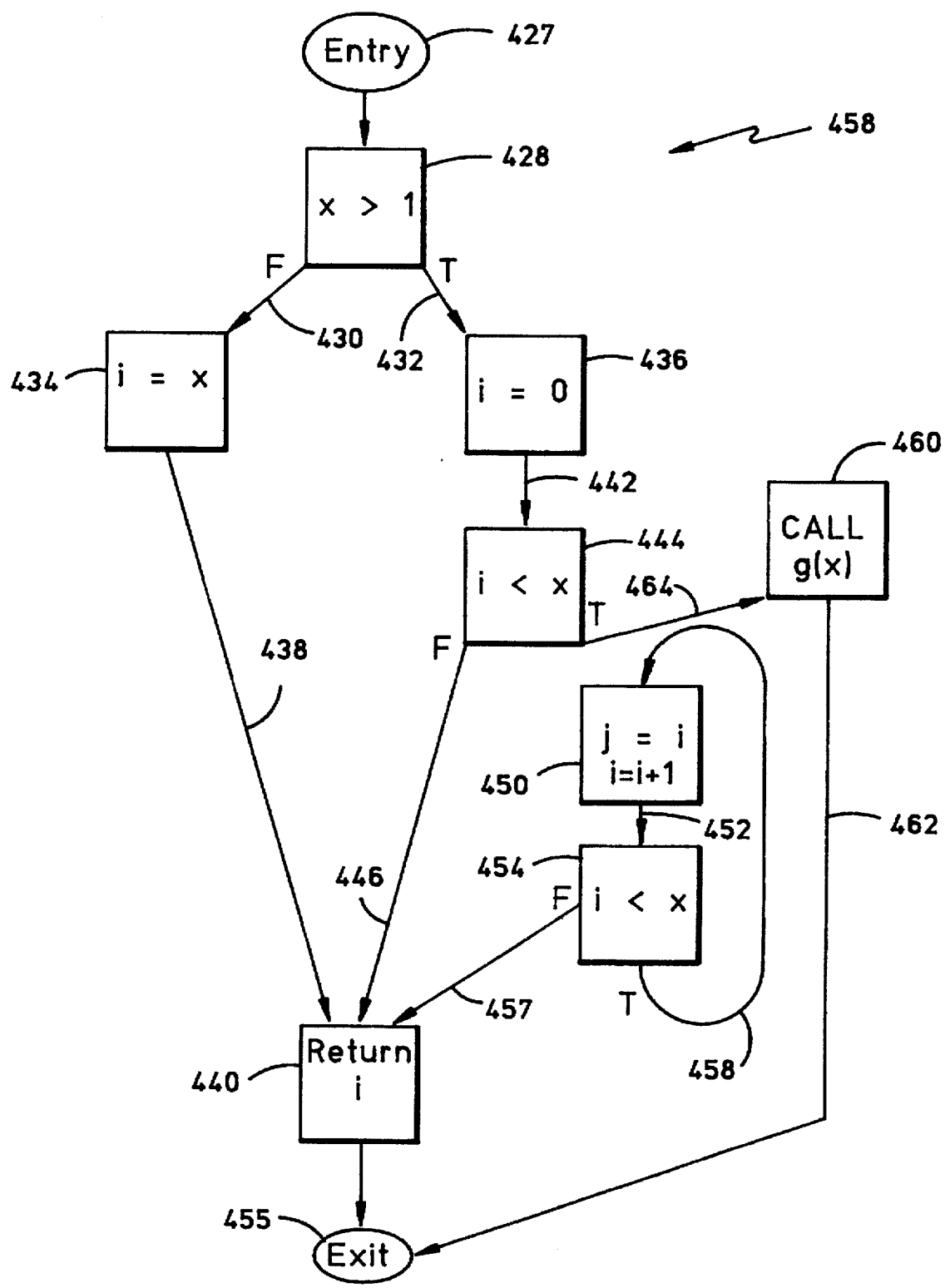

FIG. 20C shows the control flow graph 458, which is merely CFG 427 "reduced" in accordance with the method of this invention. A new basic block node 460 has been emitted with a call to the new procedure body g(x) represented by emitted subgraph 456 in FIG. 20B. Also, the output arc 462 is inserted to connect emitted node 460 to Exit Node 455, substantially in accordance with step 374 of FIG. 16. Finally, control flow arc 448 between node 444 and node 450 is removed to disconnect the two nodes and a new control flow arc 464 is added to connect nodes 444 and 460, substantially in accordance with step 376 of FIG. 16. This arc replacement procedure is preferred because it adjusts the control flow in subgraph 458 without unnecessarily eliminating the node block and arc block data structures accumulated earlier. This leaves nodes 450 and 454 "orphaned" in CFG 458, which causes no inconvenience. More conveniently, node 440 remains in CFG 458 without additional bookkeeping even though the same node was emitted as part of subgraph 456. By replacing a single input arc 448 with a new arc 464, the remainder of CFG 458 requires no additional reorganization because the g(x) subgraph 456 is merely copied to another procedure body file.

As full in-line expansion process 58 (FIG. 4) is applied to CFG 458 in FIG. 20C, the in-liner attempts to in-line g(x) procedure body 456 (FIG. 20B) when it encounters the procedure call at node 460. Because of its "weight," g(x) procedure body 456 must be rejected. Importantly, the remainder of CFG 458 may then be fully in-lined within the executable code for the example computer program "main", which offers significant opportunity for improved execution performance over that afforded by the complete rejection of CFG 427 (FIG. 20A). The inventors have tested several in-line expansion examples and find that a ten percent improvement in compiler output code execution efficiency is reasonably anticipated.

The example discussed above in connection with FIGS. 20A–20C may be succinctly summarized in terms of the following effects. First, the NODEWEIGHTs for all nodes containing a procedure call and all nodes that are at the head of a loop are increased substantially. Secondly, the MINWEIGHTs of all control flow arcs are set to equal the lowest accumulated sum of NODEWEIGHTs on the subsequent path from the arc to CFG exit node. Thirdly, the node at the head of each arc having a MINWEIGHT greater than an "inline-threshold" is identified as a root node for an emittable (qualified) subgraph that extends from the qualifying root node to the CGF exit node.

Figure 21:
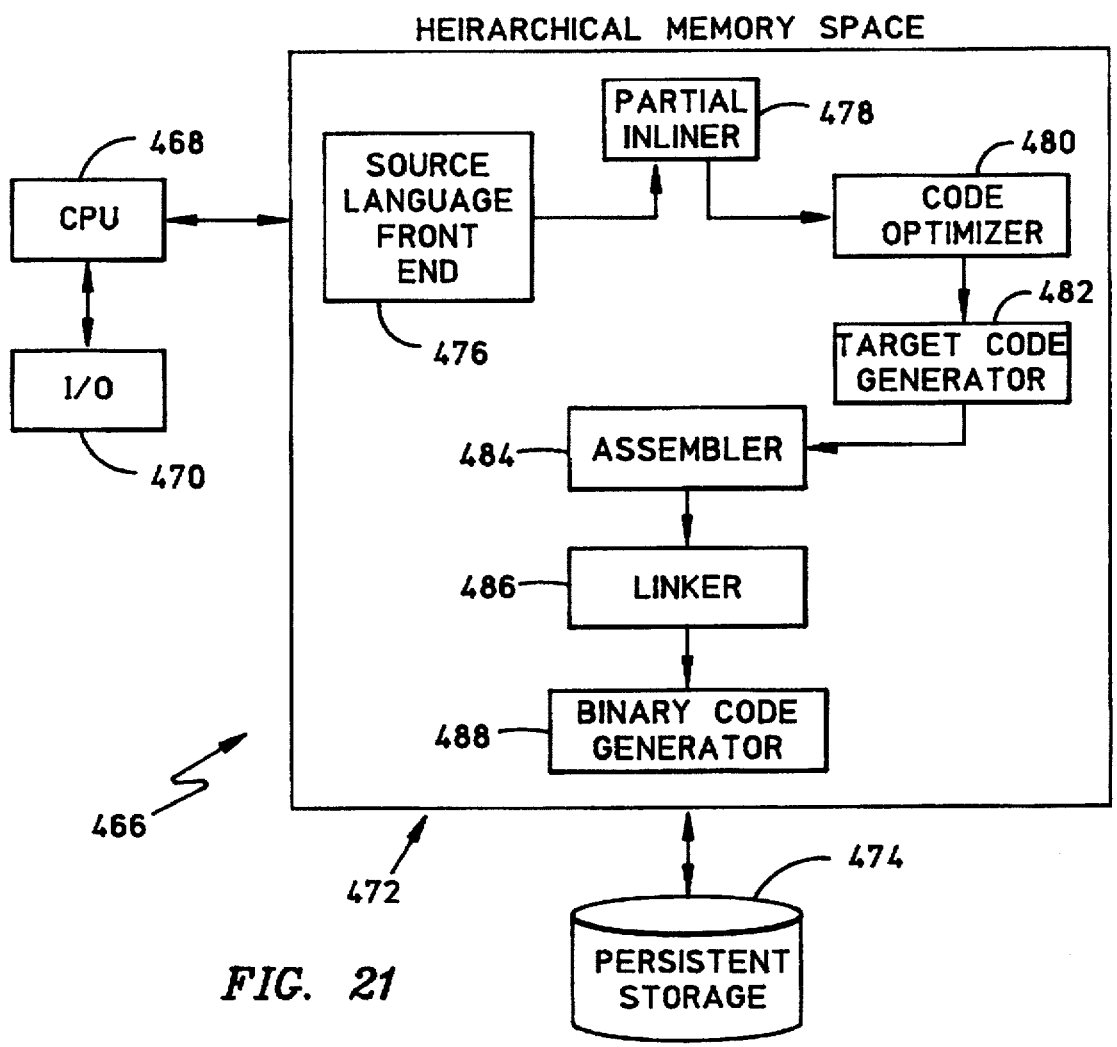
FIG. 21 is a functional block diagram of an exemplary computer system incorporating the partial in-line expansion optimizer of this invention.
Figure 22:
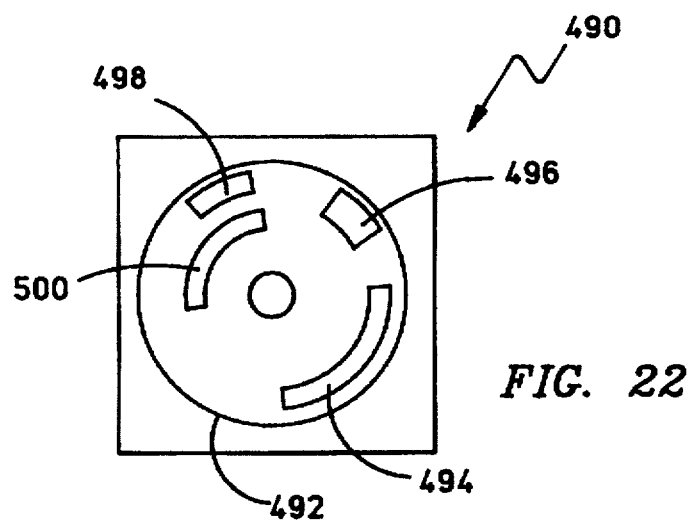
FIG. 22 is a diagram showing an exemplary computer program product incorporating the partial in-line expansion system of this invention.

Although the above description of the partial in-line expansion method of this invention is primarily embodied as a method, persons of ordinary skill in the art can understand that an apparatus, such as a conventional data processing system, may be programmed or otherwise designed to facilitate the practice of the method of this invention. For instance, FIG. 21 shows a functional block diagram of an exemplary computer processing system 466 programmed to facilitate the practice of the method of this invention. System 466 includes a central processing unit (CPU) 468 coupled to an input/output (I/O) device 470 and a hierarchical memory system 472, which is further coupled to a persistent storage system 474. Various program objects are stored within memory system 472 for access and execution by CPU 468. For example, system 472 includes a program object 476 for translating a computer program source code into an intermediate language. Object 476 is coupled to a partial in-line expansion program object 478, which includes the computer program instructions necessary to direct CPU 468 to practice the method of this invention. Object 478 is further coupled to an intermediate code optimizer program object 480, which is further coupled to a target code generator program object 482 for creating machine-dependent object code. For exemplary purposes only, object 482 is shown connected to an assembler 484, a linker 486 and a binary code generator 488. This exemplary computer system embodiment of this invention is not intended to be limiting and may reasonably include many other combinations of program objects and data structures in accordance with the claims. FIG. 22 shows an exemplary pre-recorded floppy disk 490 suitable for use with computer system 466. Floppy disk 490 includes a recording medium 492 that contains several program means for directing a data processing system to facilitate the practice of the method of this invention. For example, recording medium 492 includes stored program objects 494, 496, 498 and 500. As an example, object 500 could comprise program means for facilitating the CFG annotation process of the method of this invention in system 466 and object 496 could include program means for facilitating the remove and emit process of this invention. Practitioners skilled in the art can easily appreciate that both computer apparatus such as system 466 and computer program products such as disk 490 also fall within the spirit and scope of this invention.

Clearly, other embodiments and modifications of this invention may occur readily to those of ordinary skill in the art in view of these teachings. Therefore, this invention is to be limited only by the following claims, which include all such embodiments and modifications when viewed in conjunction with the above specification and accompanying drawing.

We claim:

1. A computer-implemented method for converting a source code computer program into a machine-readable object code, said method comprising the steps of:

receiving said source code computer program for conversion;

in response to a first procedure call having a corresponding first procedure body having an execution cost greater than a predetermined execution cost, replacing in said first procedure body a higher-cost portion of said first procedure body with a lower-cost second procedure call to a second procedure body containing said higher-cost first procedure body portion; and replacing said first procedure call in said source code computer program with said corresponding first procedure body.

2. A method of operating a compiler system for translating a computer program from source code to object code, wherein said computer program may be represented by a control flow graph (CFG) having a plurality of basic block nodes each coupled by one or more directed control flow arcs to at least one other said basic block node, said compiler system including in-line expansion means for reducing computer program execution cost by replacing a higher-cost procedure call in said computer program with the lower-cost corresponding procedure body, said method comprising the steps of:

(a) replacing in said computer program a first said procedure call with the corresponding first procedure body if the execution cost of said first procedure body is less than the execution cost of said first procedure call; otherwise (b) generating a first said CFG representing said first procedure body, said first CFG having an entry node and an exit node;

(c) reducing said first procedure body execution cost by replacing each of one or more subgraphs in said first CFG with a new basic block node containing a call to the procedure body represented by said each subgraph; and (d) repeating said replacing step (a) for the revised said first procedure body.

3. The method of claim 2 wherein said reducing step (c) comprises the steps of:

(c.1) identifying as qualified each said node in said first CFG containing a procedure call and each said node belonging to a loop within said first CFG;

(c.2) traversing said first CFG from said entry node to said exit node along every path formed by said directed arcs from said entry node without visiting any said qualified node and identifying as unqualified each said node visited;

(c.3) identifying the first said qualified node that is reached on each said path from said entry node as a qualified root node; and (c.4) disconnecting from each said qualified root node the input control flow arc and reconnecting said disconnected arc into said new basic block node containing said call to said procedure body represented by a subgraph rooted in said each qualified root node.

4. The method of claim 3 wherein said disconnecting step (c.4) comprises the step of:

(c.4.1) for each said qualified root node, assembling as an emitted subgraph said nodes and arcs on all paths from said each qualified root node that end at a single said unqualified node.

5. A computer apparatus comprising:

a central processing unit, said central processing unit executing an instruction stream embodying one or more procedures;

a program compiler, said program compiler being executed by said central processing unit and including a partial in-line expander for;

receiving a source code computer program for conversion;

responding to a first procedure call having a corresponding first procedure body having an execution cost greater than a predetermined execution cost, replacing in said first procedure body a higher-cost portion of said first procedure body with a lower-cost second procedure call to a second procedure body containing said higher-cost first procedure body portion; and replacing said first procedure call in said source code computer program with said corresponding first procedure body.

6. A computer program compiler system for translating a computer program from source code to object code, said system comprising:

in-line expansion means for replacing in said computer program a first procedure call with the corresponding first procedure body when the execution cost of said first procedure body is less than the execution cost of said first procedure call;

CFG construction means coupled to said in-line expansion means for generating a first control flow graph (CFG) representing said first procedure body, said first CFG having a plurality of basic block nodes each coupled by one or more directed control flow arcs to at least one other said basic block node, said node plurality including an entry node and an exit node; and partial expansion means coupled to said CFG construction means and to said in-line expansion means for reducing said first procedure body execution cost by replacing in said first CFG each of one or more subgraphs with a new basic block node containing a call to the procedure body represented by said each subgraph.

7. The system of claim 6 further comprising:

CFG annotation means in said partial expansion means for identifying as qualified each said node in said first CFG containing a procedure call and each said node belonging to a loop within said first CFG;

CFG traverse means in said partial expansion means for traversing said first CFG from said entry node to said exit node along every path formed by said directed arcs from said entry node without visiting any said qualified node and identifying as unqualified each said node visited;

subgraph root detection means coupled to said CFG traverse means for identifying as a qualified root node the first said qualified node that is reached on each said path from said entry node; and subgraph removal means coupled to said subgraph root detection means for disconnecting from each said qualified root node the input control flow arc and reconnecting said disconnected arc into a new basic block node containing said call to said procedure body represented by a subgraph rooted in said each qualified root node.

8. The system of claim 7 further comprising:

subgraph emission means in said subgraph removal means for assembling an emitted subgraph for each said qualified root node, said emitted subgraph including said nodes and arcs on all paths from said each qualified root node that end at a single said unqualified node.

9. A computer processing system comprising:

central processing means for executing computer program procedures;

memory means coupled to said central processing means for storing data and computer program procedures;

compiler means in said memory means for translating a computer program from source code to object code;

in-line expansion means for replacing in said computer program a first procedure call with the corresponding first procedure body when the execution cost of said first procedure body is less than the execution cost of said first procedure call;

CFG construction means coupled to said in-line expansion means for generating a first control flow graph (CFG) representing said first procedure body, said first CFG having a plurality of basic block nodes each coupled by one or more directed control flow arcs to at least one other said basic block node, said node plurality including an entry node and an exit node; and partial expansion means coupled to said CFG construction means and to said in-line expansion means for reducing said first procedure body execution cost by replacing in said first CFG each of one or more subgraphs with a new basic block node containing a call to the procedure body represented by said each subgraph.

10. The system of claim 9 further comprising:

CFG annotation means in said partial expansion means for identifying as qualified each said node in said first CFG containing a procedure call and each said node belonging to a loop within said first CFG;

CFG traverse means in said partial expansion means for traversing said first CFG from said entry node to said exit node along every path formed by said directed arcs from said entry node without visiting any said qualified node and identifying as unqualified each said node visited;

subgraph root detection means coupled to said CFG traverse means for identifying as a qualified root node the first said qualified node that is reached on each said path from said entry node; and subgraph removal means coupled to said subgraph root detection means for disconnecting from each said qualified root node the input control flow arc and reconnecting said disconnected arc into a new basic block node containing said call to said procedure body represented by a subgraph rooted in said each qualified root node.

11. The system of claim 10 further comprising:

subgraph emission means in said subgraph removal means for assembling an emitted subgraph for each said qualified root node, said emitted subgraph including said nodes and arcs on all paths from said each qualified root node that end at a single said unqualified node.

12. A computer program product for use with a computer system, said computer program product comprising:

a recording medium; and means recorded on said recording medium for directing said computer system to:
  receive said source code computer program for conversion;
  in response to a first procedure call having a corresponding first procedure body having an execution cost greater than a predetermined execution cost, replace in said first procedure body a higher-cost portion of said first procedure body with a lower-cost second procedure call to a second procedure body containing said higher-cost first procedure body portion; and
  replace said first procedure call in said source code computer program with said corresponding first procedure body.

13. A computer program product for use with a computer system having a central processing unit (CPU) for processing data responsive to stored computer programs and having a memory for storing said computer programs, said computer program product comprising:

a recording medium;

means recorded on said recording medium for directing said computer system to translate a computer program from source code to object code, wherein said computer program may be represented by a control flow graph (CFG) having a plurality of basic block nodes each coupled by one or more directed control flow arcs to at least one other said basic block node;

means recorded on said recording medium for directing said computer system to reduce computer program execution cost by replacing a higher-cost procedure call in said computer program with the lower-cost corresponding procedure body;

means recorded on said recording medium for directing said computer system to replace in said computer program a first said procedure call with the corresponding said first procedure body when the execution cost of said first procedure body is less than the execution cost of said first procedure call;

means recorded on said recording medium for directing said computer system to generate a first said CFG representing said first procedure body, said first CFG having an entry node and an exit node; and means recorded on said recording medium for directing said computer system to reduce said first procedure body execution cost by replacing each of one or more subgraphs in said first CFG with a new basic block node containing a call to the procedure body represented by said each subgraph.

14. The computer program product of claim 13 further comprising:

means recorded on said recording medium for directing said computer system to identify as qualified each said node in said first CFG containing a procedure call and each said node belonging to a loop within said first CFG;

means recorded on said recording medium for directing said computer system to traverse said first CFG from said entry node to said exit node along every path formed by said directed arcs from said entry node without visiting any said qualified node and identify as unqualified each said node visited;

means recorded on said recording medium for directing said computer system to identify the first said qualified node that is reached on each said path from said entry node as a qualified root node; and means recorded on said recording medium for directing said computer system to disconnect from each said qualified root node the input control flow arc and reconnect said disconnected arc into said new basic block node containing said call to said procedure body represented by a subgraph rooted in said each qualified root node.

15. The computer program product of claim 14 further comprising:

means recorded on said recording medium for directing said computer system to assemble an emitted subgraph for each said qualified root node, said emitted subgraph including said nodes and arcs on all paths from said each qualified root node that end at a single said unqualified node.

* * * * *